United States Patent
Stamatopoulos et al.

(10) Patent No.: US 12,493,812 B2
(45) Date of Patent: Dec. 9, 2025

(54) QUANTUM ADVANTAGE USING QUANTUM CIRCUIT FOR GRADIENT ESTIMATION

(71) Applicants: Goldman Sachs & Co. LLC, New York, NY (US); International Business Machines Corporation, Armonk, NY (US)

(72) Inventors: Nikitas Stamatopoulos, New York, NY (US); Guglielmo Mazzola, Zurich (CH); Stefan Woerner, Zurich (CH); William J. Zeng, New York, NY (US)

(73) Assignee: Goldman Sachs & Co. LLC, New York, NY (US)

( * ) Notice: Subject to any disclaimer, the term of this patent is extended or adjusted under 35 U.S.C. 154(b) by 503 days.

(21) Appl. No.: 17/990,473

(22) Filed: Nov. 18, 2022

(65) Prior Publication Data

US 2023/0419153 A1    Dec. 28, 2023

Related U.S. Application Data

(60) Provisional application No. 63/281,313, filed on Nov. 19, 2021.

(51) Int. Cl.
*G06N 10/60* (2022.01)
*G06N 10/20* (2022.01)

(52) U.S. Cl.
CPC ............. *G06N 10/60* (2022.01); *G06N 10/20* (2022.01)

(58) Field of Classification Search
None
See application file for complete search history.

(56) References Cited

U.S. PATENT DOCUMENTS

| | | | |
|---|---|---|---|
| 2019/0220497 A1* | 7/2019 | Wiebe | G06N 10/60 |
| 2020/0364601 A1* | 11/2020 | Yamazaki | G16C 20/90 |
| 2021/0097422 A1* | 4/2021 | Verdon-Akzam | G06N 7/01 |
| 2022/0101167 A1* | 3/2022 | Pakhomchik | G06N 10/20 |
| 2022/0391742 A1* | 12/2022 | Amaro | G06N 10/80 |
| 2023/0126123 A1* | 4/2023 | Huggins | G06N 10/20 |
| 2025/0053844 A1* | 2/2025 | Mohanty | G06N 10/60 |
| 2025/0209362 A1* | 6/2025 | Sivakumar | G06N 10/60 |

OTHER PUBLICATIONS

Bennett, C. H. "Logical Reversibility of Computation." IBM Journal of Research and Development, vol. 17, No. 6, Nov. 1973, pp. 525-532.

(Continued)

*Primary Examiner* — Ryan Barrett
(74) *Attorney, Agent, or Firm* — Fenwick & West LLP

(57) ABSTRACT

Described herein are quantum gradient algorithms that result in a quantum advantage over conventional methods. In an example, a quantum circuit is configured to implement a quantum gradient algorithm when executed on qubits of a quantum computing system. The quantum gradient algorithm includes a phase oracle $O_{Sf}^m$ defined by a finite difference approximation with an order greater than zero, and a complexity of the quantum gradient algorithm scales as $\mathcal{O}(\sqrt{k}/\epsilon)$. The quantum circuit is repeatedly executed on qubits of a quantum computing system to determine a k-dimensional gradient of a function $f(x)$ within an error $\epsilon$ at point $x_0$.

19 Claims, 10 Drawing Sheets

(56) References Cited

OTHER PUBLICATIONS

Black, F. et al. "The Pricing of Options and Corporate Liabilities." Journal of Political Economy, vol. 81, No. 3, May-Jun. 1973, pp. 637-654.

Brassard, G. et al. "Quantum Amplitude Amplification and Estimation." arXiv Preprint arXiv:quant-ph/0005055v1, May 2, 2000, pp. 1-32.

Capriotti, L. "Fast Greeks by Algorithmic Differentiation." The Journal of Computation Finance, vol. 14, No. 3, Spring 2011, pp. 3-35.

Capriotti, L. et al. "Fast Correlation Greeks by Adjoint Algorithmic Differentiation." arXiv Preprint arXiv:1004.1855v1, Apr. 11, 2010, pp. 1-6.

Chakrabarti, S. et al. "A Threshold for Quantum Advantage in Derivative Pricing." Quantum: The Open Journal for Quantum Science, vol. 5, Jun. 1, 2021, pp. 1-41.

Chakrabarti, S. et al. "Quantum Algorithms and Lower Bounds for Convex Optimization." Quantum: The Open Journal for Quantum Science, vol. 4, Jan. 13, 2020, pp. 1-44.

Egger, D. J. et al. "Credit Risk Analysis Using Quantum Computers." arXiv Preprint arXiv:1907.03044v1, Jul. 5, 2019, pp. 1-8.

Fornbeg, B. "Generation of Finite Difference Formulas on Arbitrarily Spaced Grids." AMS: Mathematics of Computation, vol. 51, No. 184, Oct. 1988, pp. 699-706.

Fowler, A. G. et al. "Low Overhead Quantum Computation Using Lattice Surgery." arXiv Preprint arXiv:1808.06709v4, Aug. 30, 2019, pp. 1-15.

Gilyen, A et al. "Optimizing Quantum Optimization Algorithms via Faster Quantum Gradient Computation." Proceedings of the 2019 Annual ACM-SIAM Symposium on Discrete Algorithms (SODA), Jan. 6-9, 2019, pp. 1425-1444.

Gilyen, A. et al. "Quantum Singular Value Transformation and Beyond: Exponential Improvements for Quantum Matrix Arithmetics." Proceedings of the 51st Annual ACM SIGACT Symposium on Theory of Computing, Jun. 2019, pp. 193-204.

Glasserman, P. et al. "Some Guidelines and Guarantees for Common Random Numbers." Management Science, vol. 38, No. 6, Jun. 1992, pp. 884-908.

Grinko, D. et al. "Iterative Quantum Amplitude Estimation." npj: Quantum Information, vol. 7, Mar. 19, 2021, pp. 1-6.

Homescu, C. "Adjoints and Automatic (Algorithmic) Differentiation in Computation Finance." arXiv Preprint arXiv:1107.1831v1, Jul. 10, 2011, pp. 1-24.

Jordan, S. P. "Fast Quantum Algorithm for Numerical Gradient Estimation." arXiv Preprint arXiv:quant-ph/0405146v2, Jan. 2, 2005, pp. 1-4.

Low, G. H. et al. "Hamiltonian Simulation by Qubitization." Quantum: The Open Journal for Quantum Science, vol. 3, Jul. 12, 2019, pp. 1-23.

Martyn, J. M. et al. "Efficient Fully-Coherent Hamiltonian Simulation." arXiv Preprint arXiv:2110.11327v6, Jan. 10, 2023, pp. 1-26.

Montanaro, A. "Quantum Speedup of Monte Carlo Methods." Proceedings of the Royal Society A: Mathematical, Physical and Engineering Sciences, vol. 471, No. 2181, Sep. 2015, pp. 1-20.

Pages, G. et al. "Vibrato and Automatic Differentiation for High Order Derivatives and Sensitivities of Financial Options." arXiv Preprint arXiv:1606.06143v1, Jun. 20, 2016, pp. 1-32.

PCT International Search Report and Written Opinion, PCT Application No. PCT/IB2022/061157, Feb. 27, 2023, 13 pages.

Rebentrost, P. et al. "Quantum Computational Finance: Monte Carlo Pricing of Financial Derivatives." Physical Review A, vol. 98, Aug. 20, 2018, pp. 1-15.

Stamatopoulos, N. et al. "Option Pricing using Quantum Computers." Quantum: The Open Journal for Quantum Science, vol. 4, Jul. 2020, pp. 1-20.

Stamatopoulos, N. et al. "Towards Quantum Advantage in Financial Market Risk using Quantum Gradient Algorithms." Quantum: The Open Journal for Quantum Science, vol. 6, Jul. 2022, pp. 1-25.

Suzuki, Y. et al. "Amplitude Estimation Without Phase Estimation." Quantum Information Processing, vol. 19, Jan. 9, 2020, pp. 1-17.

Tanaka, T. et al. "Amplitude Estimation via Maximum Likelihood on Noisy Quantum Computer." Quantum Information Processing, vol. 20, Sep. 4, 2021, pp. 1-29.

Vazquez, A. C. et al. "Efficient State Preparation for Quantum Amplitude Estimation." arXiv Preprint arXiv:2005.07711v1, May 19, 2020, pp. 1-12.

Woerner, S. et al. "Quantum Risk Analysis." npj: Quantum Information, vol. 5, Feb. 8, 2019, pp. 1-8.

\* cited by examiner

700

Receive a function f(x) describing a quantity of a resource, x representing a set of k parameters of the quantity
705

Repeatedly execute a quantum gradient algorithm on a quantum computing system to determine a k-dimensional gradient of the function f(x) within an error ε at point $x_0$
710

QUANTUM ADVANTAGE USING QUANTUM CIRCUIT FOR GRADIENT ESTIMATION

CROSS-REFERENCE TO RELATED APPLICATION

This application claims the benefit of U.S. Provisional Patent Application Ser. No. 63/281,313, filed on Nov. 19, 2021, which is incorporated by reference.

BACKGROUND

1. Technical Field

This disclosure relates generally to quantum gradient algorithms, and more particularly to quantum circuits that implement phase oracles to determine gradients.

2. Description of Related Art

Jordan (arXiv:quant-ph/0405146) and Gilyén (arXiv:1711.00465) describe a quantum algorithm for determining a gradient of a function. However, the algorithm can only guarantee a complexity scaling advantage over classical computations if the algorithm is applied to functions that are a specific class of smooth functions (Gevrey class $G^{1/2}$ functions).

SUMMARY

Many functions describing real-world phenomena are not Gevrey class $G^{1/2}$ functions. Thus, the algorithm described by Jordan and Gilyén cannot guarantee a complexity scaling advantage for these types of functions. In contrast, the present disclosure describes quantum circuits implementing quantum gradient algorithms (referred to as the SFQG methods) that provide an advantage over classical computations for functions without requiring the functions to be Gevrey class $G^{1/2}$ functions.

In some embodiments, a quantum gradient algorithm (e.g., an SFQG method) includes a phase oracle $O_{Sf}^m$ defined by a finite difference approximation with an order greater than zero. A quantum gradient algorithm may be implemented by preparing and executing a quantum circuit on qubits of a computing system. The phase oracle $O_{Sf}^m$ may be given by: $O_{Sf}^m$:

$$|x\rangle \to e^{2\pi i S \sum_{l=-m}^{m} a_l^{(2m)} f(lx)}|x\rangle,$$

where m is the finite-difference approximation order greater than zero, $|x\rangle$ is a k-dimensional vector representing the set of k parameters, S is a scaling factor controlling the accuracy of the finite-difference approximation, and $a_l^{(2m)}$ are coefficients of the finite-difference approximation of order m. For a function $f(x)$ describing a quantity of a resource, where x represents a set of k parameters of the quantity, a quantum gradient algorithm can be repeatedly executed by a quantum computing system to determine a k-dimensional gradient of the function $f(x)$ within an error $\epsilon$ at point $x_0$. Among other advantages, a complexity of the quantum gradient algorithm scales as $\mathcal{O}(\sqrt{k}/\epsilon)$ or less.

Other aspects include components, devices, systems, improvements, methods, processes, applications, computer readable mediums, and other technologies related to any of the above.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

FIG. 7 is a method chart illustrating an example method for determining a gradient of a function $f(x)$ describing a quantity of a resource.

DETAILED DESCRIPTION

Figure 1:
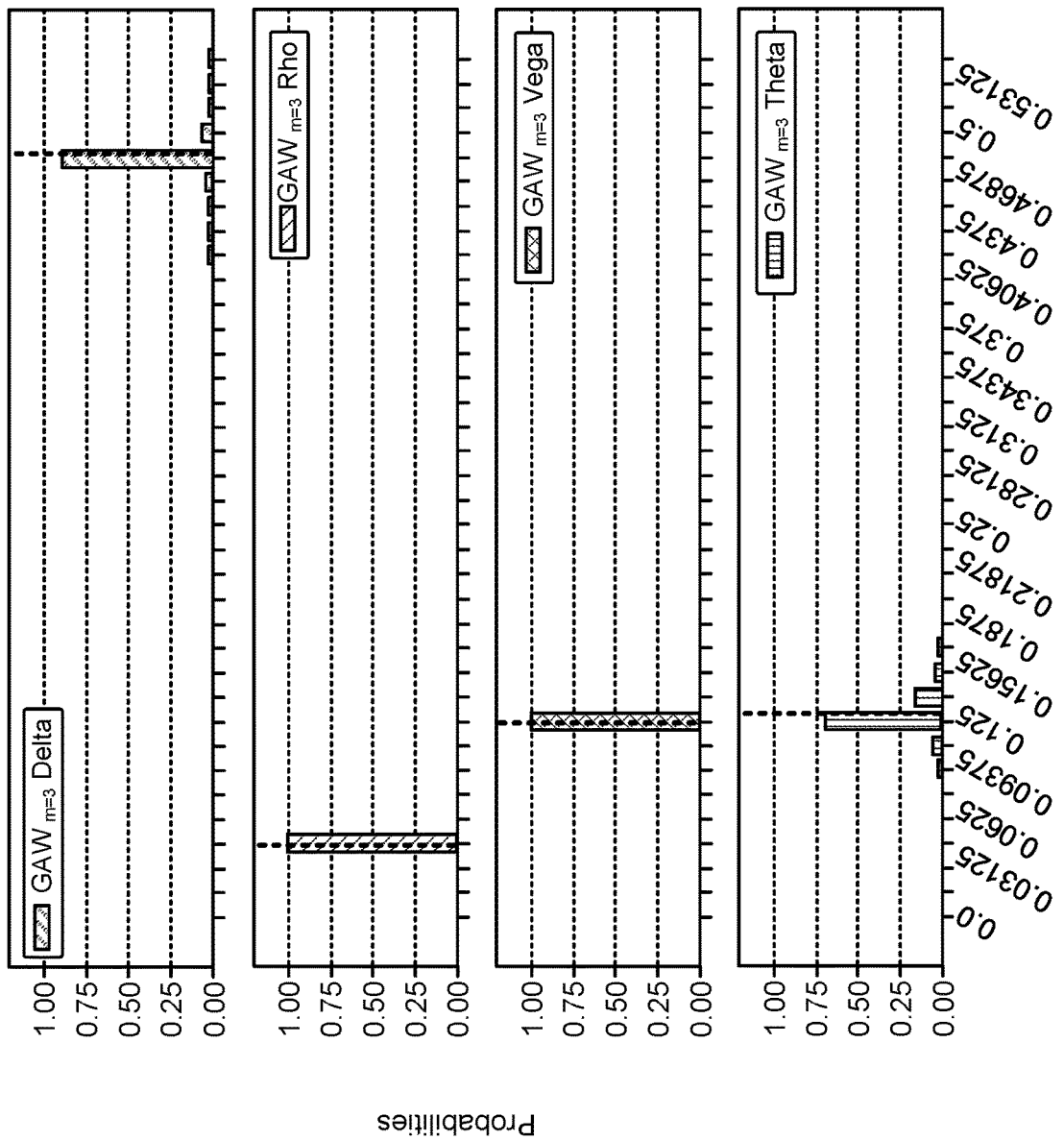
FIG. 1 illustrates an example probability distribution resulting from a numerical simulation of a quantum gradient algorithm.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Disclosed are quantum algorithms to compute, among other things, the market risk of financial derivatives. Quantum amplitude estimation can accelerate derivative pricing quadratically in the target error and this may be extended to a quadratic error scaling advantage in market risk computation. Employing quantum gradient estimation algorithms can deliver a further quadratic advantage in the number of the associated market sensitivities, called greeks. By numerically simulating the quantum gradient estimation algorithms on financial derivatives of practical interest, example greeks can be successfully estimated, while the resource requirements can be significantly lower in practice than what is expected by theoretical complexity bounds. This additional advantage in the computation lowers the estimated logical clock rate used for quantum advantage from Chakrabarti (arXiv:2012.03819) by a factor of ~7, from 50 MHz to 7 MHz, even for a modest number of greeks by industry standards (four). Moreover, using a system with sufficient resources, the quantum algorithm can be parallelized across up to 60 QPUs, in which case the logical clock rate of each device used to achieve the same overall runtime as the serial execution is ~100 kHz. Throughout this disclosure, several different combinations of quantum and classical approaches that may be used for computing the market risk of financial derivatives (among other things) are summarized and compared.

1. INTRODUCTION

Quantum algorithms have the potential to accelerate certain real-world calculations, such as the pricing and risk analysis of financial derivatives. Some of these algorithms use quantum amplitude estimation to achieve quadratic advantage compared to the classical Monte Carlo methods that are used in practice for most computationally expensive pricing. Let $\epsilon_p$ be the error in pricing. The quantum advantage stems from the runtime of a classical Monte Carlo simulation scaling as $\mathcal{O}(1/\epsilon_p^2)$, while the quantum algorithms have scaling $\mathcal{O}(1/\epsilon_p)$.

A related and important financial application is the computation of the sensitivity of derivative prices to model and market parameters. This amounts to computing gradients of the derivative price with respect to input parameters. An example business use of calculating these gradients is to enable hedging of the market risk that arises from exposure to derivative contracts. Hedging this risk may be of critical importance to financial firms. In some cases, gradients can be computed analytically, e.g. when the derivative price has an analytical form. In some embodiments, the disclosed systems and methods computes gradients where there is not a closed form for the price and where the classical comparison is to Monte Carlo simulation. Gradients of financial derivatives are typically called greeks, as these quantities are commonly labeled using Greek alphabet letters. For k greeks (a k-dimensional gradient) classical finite difference methods may compute the price at multiple points in each parameter dimension for a scaling of $\mathcal{O}(k/\epsilon_p^2)$.

One approach to quantum acceleration of greek computation is to construct a finite difference approximation of the financial derivative's price on a quantum computer and perform amplitude estimation on that quantity instead of its price. Sec. 2.4 demonstrates that this approach, called the semi-classical method, scales as (k/c), where c is the target error for the gradients. However, one can further improve the scaling in the number of greeks k, using quantum algorithms for computing the gradients.

A quantum algorithm to compute a gradient's components in superposition was originally introduced by Jordan (arXiv: quant-ph/0405146) and more recently revisited by Gilyén (arXiv:1711.00465), however these references do not consider applying the quantum algorithm to greek computations. Gilyén perform an analysis of Jordan's original quantum gradient algorithm to show that in general it scales as $\mathcal{O}(k/\epsilon^2)$. Gilyén then generalizes the algorithm to arbitrary higher order m and shows that an order $m=\log(\sqrt{k}/\epsilon)$ quantum gradient algorithm has runtime of $\mathcal{O}(\sqrt{k}/\epsilon E)$ for a specific class of smooth functions. For the sake of simplicity, in the rest of this disclosure we refer to this result as the GAW quantum gradient algorithm.

In this disclosure, the algorithmic framework from Gilyén is applied to compute financial greeks and study several varieties of quantum gradient algorithms. The quantum pricing method of Chakrabarti is used as a subroutine to the GAW algorithm to numerically estimate the resource requirements of computing the greeks of two types of option contracts: (a) a European call option, which can be used as a benchmark to establish the validity of the algorithm and estimate the corresponding resource requirements, and (b) a path-dependent basket option with a pricing profile that is representative of typical financial derivative contracts of practical interest.

This disclosure also introduces a second-order accurate quantum gradient algorithm, the m=1 version, for which an explicit and compact quantum implementation in the financial derivative case is disclosed that does not rely on block encoding or Hamiltonian simulation. This Simulation-Free Quantum Gradient (SFQG) method may be used to compute the greeks of a path-dependent derivative and can be significantly cheaper to construct than the Hamiltonian-based method. Additionally, the disclosed approaches can improve the overall performance of quantum gradient estimation algorithms by employing a maximum likelihood (MLE) method to extract the most likely estimate of the gradients with concrete confidence intervals. With these tools, quantum advantage for calculating risk may be achievable with quantum computers whose clock rates are seven times slower than those for pricing itself. This is described in more detail in Section 7.

Additionally, this disclosure includes a comparison between quantum, classical, and semi-classical gradient estimation algorithms in the context of financial derivatives, summarized in Table 4.

Additional new contributions are highlighted in the following paragraphs:

Section 4 describes numerically studying the quantum gradient estimation algorithms from Gilyén and Jordan for functions of practical interest to financial market risk and compare the observed oracular cost to theoretical expectations.

Section 5 describes a method to construct a second-order accurate oracle for quantum gradient estimation for functions computed using quantum amplitude estimation that is cheaper in resources used compared to existing methods.

Section 6 describes a way to improve gradient estimation algorithms using classical maximum likelihood estimation (MLE).

Section 7 provides resource estimates for quantum advantage in financial derivative pricing.

Section 9 describes a technique to employ automatic differentiation (AD) methods on quantum computers which can enhance the quantum gradient estimation performance in certain cases.

1.1 Quantum Amplitude Estimation

In various embodiments, gradient calculation algorithms extend the quantum accelerated method for derivative pricing that is based on quantum amplitude estimation (QAE). QAE is further described here. Let the k-dimensional vector x denote the set of market data parameters of the derivative represented as a basis state $|x\rangle$ and $f(x)$ its price, rescaled to satisfy $f(x) \in [0, 1]$. Assuming the existence of a unitary operator A produces the state $$|\vec{0}\rangle_x \mathcal{A} \to (\sqrt{1-f(x)}|\psi_0(x)\rangle \mathcal{A}|0\rangle \mathcal{A} + \sqrt{f(x)}|\psi_1(x)\rangle \mathcal{A}|1\rangle \mathcal{A})|x\rangle \mathcal{A}, \quad (1)$$

where $|\psi_0(x)\rangle \mathcal{A}$ and $|\psi_1(x)\rangle \mathcal{A}$ are arbitrary, normalized quantum states. The state $|x\rangle \mathcal{A}$ representing the market data parameters acts only as input to $\rangle$ and can be ignored for the remainder of this section.

QAE estimates $f(x)$ with repeated applications of the operator $\mathcal{A} = \rangle S_0 \mathcal{A}^\dagger S_{\psi_0}$, where $S_0 = \mathcal{A} - 2|\vec{0}\rangle \mathcal{A} \mathbb{I} \langle \vec{0}|$ and $S_{\psi_0} = \mathcal{A} - 2|\psi_0(x)\rangle \mathcal{A}|0\rangle \mathcal{A} \mathbb{I} \langle 0| \mathcal{A} \langle \psi_0(x)|$, where $\mathcal{A}$ is the identity matrix. The QAE algorithm relies on the fact that, by the construction of $\mathcal{A}$, the state produced after the application of $\rangle$ in Eq. (1) can be written in the eigenbasis of $\mathcal{A}$:

$$\frac{-i}{\sqrt{2}}\left(e^{i\theta(x)}|\psi_+(x)\rangle - e^{-i\theta(x)}|\psi_-(x)\rangle\right) \equiv |\psi_+(x)\rangle, \quad (2)$$

where $|\psi_+(x)\rangle \mathcal{A}$ and $|\psi_-(x)\rangle \mathcal{A}$ are the eigenvectors of $\mathcal{A}$ with eigenvalues $e^{\pm 2i\theta(x)}$, and $f(x)=\sin^2(\theta(x))$. Let integer m>0 denote the bits of precision with which we want to estimate the amplitude. Applying $H^{\otimes m}$ on an m-qubit register initialized at $|0\rangle\mathcal{A}_m$ and using the register to control different powers of $\mathcal{A}$, a phase kickback of the eigenvalues of $\mathcal{A}$ is induced onto the control register $$\frac{1}{\sqrt{M}}\sum_{j=1}^{M-1}|j\rangle Q^j|\psi(x)\rangle = \frac{1}{\sqrt{M}}e^{2ij\theta(x)}|j\rangle|\psi_+(x)\rangle - \frac{1}{\sqrt{M}}\sum_{j=0}^{M-1}e^{2ij\theta(x)}|j\rangle|\psi_-(x)\rangle, \quad (3)$$

where $|\psi_\pm(x)\rangle\mathcal{A}=-ie^{\pm i\theta(x)}|\psi_\pm(x)\rangle\mathcal{A}/\sqrt{2}$ and $M=2^m$. Subsequently, applying an inverse Quantum Fourier Transform on the first register and measuring in the computational basis gives an m-bit approximation of either $\bar{\theta}_+(x)=M\theta(x)/\pi$ or $\bar{\theta}_-(x)=-M\theta(x)/\pi$. This can then be classically mapped to an estimate for $f(x)$ using $$\bar{f}(x) = \sin^2\left(\frac{\pi\bar{\theta}_\pm(x)}{M}\right). \quad (4)$$

To approximate $\bar{f}(x)$ within additive error $c_p$ with high probability, QAE uses $M=\mathcal{O}(1/\epsilon_p)$ invocations to $Q$. The query complexity of the QAE algorithm is measured by counting the number of calls to the oracles $\mathcal{A}$ and $\mathcal{A}^\dagger$ and this scales as $\mathcal{O}(2/\epsilon_p)$. In the case of financial derivatives, the function $f$ is the expectation value of the payoff of a derivative contract.

2. GRADIENT METHODS FOR FINANCIAL DERIVATIVES

Several methods for computing the gradients of financial derivatives may be used. The complexities of these approaches are summarized in Table 1.

2.1 Greeks

Let $S^t \in \mathbb{R}_+^d$ be a vector of values for d underlying assets at time t. Let $(S^1, \ldots, S^T)=\bar{\omega}\in\bar{\Omega}$ be a path of a discrete time multivariate stochastic process describing the values of those assets in time when the current (today's) market values of these assets are $S^0$. Both notations may be used for a path in the text. The corresponding probability density function is denoted by $\bar{p}(S^0, \bar{\omega})$. Let $g(S^0, \ldots, \bar{\omega})=g(S^0, \ldots, S^T)\in\mathbb{R}$ be the discounted payoff of some derivative on those assets. The price of the derivative may be calculated using:

$$\mathbb{E}(g) = \int_{\bar{\omega}\in\bar{\Omega}} \bar{p}(S^0, \bar{\omega})g(S^0, \bar{\omega})d\bar{\omega} \approx \sum_{\omega\in\Omega} p(S^0, \omega)g(S^0, \omega) \quad (5)$$

where the bar notation has been removed to indicate a switch from a continuous to a discrete model of prices. Gradients of this price are known as greeks.

Example 1 (Delta) Consider a single underlying (d=1) and define the gradient of the underlying with respect to the spot price $S^0$ as $$\Delta = \frac{\partial \mathbb{E}(g)}{\partial S^0}. \quad (6)$$

Other commonly used greeks are gradients of the price with respect to the time T(theta), the volatility of the underlying model for S(vega), the correlation between assets, or other parameters. In general one calculates $\mathbb{E}(g,x)$ for some model and/or market parameters x and then wishes to compute the set $$\left\{\frac{\partial \mathbb{E}(g)}{\partial \theta_{i=1\ldots k}}\right\}.$$

Remarkably, k can be on the order of hundreds or thousands in practical cases. For this reason, a k scaling improvement represents advantage in this context.

2.2 Classical Finite Difference

Let $f(x)=\mathbb{E}(g,x)$ be the pricing function for a fixed payoff g. Classically, one can compute the gradients of a function $f: \mathbb{R}^k \to \mathbb{R}$ using finite-difference methods by sampling the function $f$ over a sufficiently small region h so that expanding $f$ to first order gives a good approximation to $f(x)\approx f(a)+(x-a)\cdot\nabla f$. A forward finite-difference classical scheme to compute the gradients at a point $x_0$ uses k+1 evaluations of $f$, one at $x_0$ and k evaluations displaced from $x_0$ by h in each dimension. The gradient is then approximated using $\partial f/\partial x_i \approx [f(x_0+h\hat{e}_i)]-f(x_0)/h + \mathcal{O}(h)$, where $\hat{e}_i$ is the ith normalized basis vector. For a more accurate approximation, a second-order scheme which uses 2k function evaluations may be used, and the gradients may be approximated with:

$$\partial f/\partial x_i \approx \frac{f\left(x_0 + \frac{h}{2}\hat{e}_i\right) - f\left(x_0 + \frac{h}{2}\hat{e}_i\right)}{h} + \mathcal{O}(h^2). \quad (7)$$

Now suppose that the function $f(x)$ is evaluated with a finite accuracy $\delta\geq 0$. The associated error for the forward or central finite differences formulas reads $$\frac{f(x+h) - f(x-(p-1)h) + \mathcal{O}(\delta)}{ph} + \mathcal{O}(h^p) = \partial_x f(x) + \mathcal{O}(\delta/h + h^p), \quad (8)$$

where p=1 for forward and p=2 for central finite differences. Suppose now that one wants to achieve an overall estimation error of $\epsilon>0$:

$$\delta/h + h^p \leq \epsilon, \quad (9)$$

focussing on the asymptotic scaling. While the step size h can be freely chosen, improving the accuracy $\delta$ is usually related to increasing computational costs. Thus, the goal is to maximize $\delta$ by setting h while still achieving the target accuracy $\epsilon$. This leads to $$\delta = (\epsilon - h^p)h = \epsilon h - h^{p+1} \quad (10)$$

Setting the first derivative of the right-hand-side with respect to h to zero leads to $$h=(\epsilon/(p+1))^{(1/p)}, \quad (11)$$

which leads to the optimal $\delta$ for a target $\epsilon$ given by $$\delta = \mathcal{O}(\epsilon^{1+1/p}) \quad (12)$$

When $f(x)$ is approximated by algorithms relying on sampling, the number of samples for a target approximation error scales as $\delta=(1/M^q)$, where M denotes here the number of samples and q depends on the convergence rate of the algorithm: q=1/2 for classical Monte Carlo simulation and q=1 for QAE. Then, combining everything together leads to $$M = \mathcal{O}(\epsilon^{-(1+1/p)/q}). \quad (13)$$

Thus, using p=2 and q=1/2, the complexity of computing k greeks is calculated using a central-difference method with Monte Carlo is $\mathcal{O}(k/\epsilon^3)$. This approach may be referred to as the classical finite difference (CFD) method.

2.3 Finite-Difference with Common Random Numbers

Another approach for computing greeks, when derivative pricing is done classically with Monte Carlo, is to use the second-order central-difference method of Eq. (7), but to perform correlated sampling by using the same random numbers in the Monte Carlo evaluation of both $$f\left(x_0 + \frac{h}{2}\hat{e}_i\right) \text{ and } f\left(x_0 - \frac{h}{2}\hat{e}_i\right).$$

This way the statistical fluctuations present in both terms cancel out, effectively removing the overall error dependence on the discretization step h. The complexity of evaluating k greeks in this case is $\mathcal{O}(k/\epsilon^2)$, which is also classically optimal. This method may be referred to as the classical finite difference with common random numbers (CFD-CRN).

2.4 Semi-Classical Quantum Gradients

An approach to improve the finite-difference method using quantum computation is to use a central-difference formula with quantum amplitude estimation algorithm for each pricing step. This semi-classical quantum gradient (SQG) method then scales as $\mathcal{O}(k/\epsilon^{1.5})$, which can be obtained by substituting p=2 and q=1 in Eq. (13). This approach can be improved upon in a similar manner to using CRN for classical finite difference. Instead of computing $$\mathbb{E}\left(f\left(x_0 + \frac{h}{2}\hat{e}_i\right)\right) \text{ and } \mathbb{E}\left(f\left(x_0 - \frac{h}{2}\hat{e}_i\right)\right)$$

separately using amplitude estimation, one can compute $$\mathbb{E}\left(\left(f\left(x_0 + \frac{h}{2}\hat{e}_i\right) - f_\omega\left(x_0 - \frac{h}{2}\hat{e}_i\right)\right)/h\right).$$

This can be done by computing the quantity $$\left|\left(f_\omega\left(x_0 + \frac{h}{2}\hat{e}_i\right) - f_\omega\left(x_0 - \frac{h}{2}\hat{e}_i\right)\right)/h\right\rangle$$

in a quantum register, where $f_\omega$ denotes the payoff for each path $\omega$ (cf. Sec. 2.1) and then using amplitude estimation on this quantity. In this case the output of amplitude estimation is $$\sum_{\omega \in \Omega} p(\omega)\left(f_\omega(x_0 + (h/2)\hat{e}_i) - f_\omega(x_0 - (h/2)\hat{e}_i)\right)/h \approx \mathbb{E}(\partial_i f(x)) \quad (14)$$

giving the expectation value of the finite difference approximation of the ith derivative. The advantage of this method is that there are no separate statistical fluctuations associated individually with $f_\omega(x_0 \pm (h/2)\hat{e}_i)$ and the standard $\mathcal{O}(1/\epsilon)$ scaling of amplitude estimation is recovered. For k gradients, the overall complexity of this approach is $\mathcal{O}(k/\epsilon)$.

2.5 Quantum Gradients

Some quantum approaches (for computing greeks) may use a quantum Fourier transform to compute the gradient with an improved scaling in the dimension k. These quantum algorithms include access to a fractional phase oracle for the target function $f: \mathbb{R}^k \mapsto \mathbb{R}$, such as the pricing function of Section 1.1. This oracle, given a point $x \in \mathbb{R}^k$ and S>0, performs the operation $$O_{S,f}|x\rangle \, e^{2\pi i S f(x)}|x\rangle. \quad (15)$$

To estimate the k-dimensional gradient of $f$ at point $x_0$, the oracle is evaluated over a uniform superposition of points $\delta$ in a sufficiently small k-dimensional hypercube $G_{x_0}^k$ of edge length 1 around $x_0$ where each dimension is discretized using N points with n=log N qubits, such that $$\frac{1}{\sqrt{N^k}} \sum_{\delta \in G_{x_0}^k} O_{S_f}|\delta\rangle = \frac{1}{\sqrt{N^k}} \sum_{\delta \in G_{x_0}^k} e^{2\pi i S f(x_0+\delta)}|\delta\rangle \approx \quad (16)$$

$$e^{2\pi i S f(x_0)} \frac{1}{\sqrt{N^k}} \sum_{\delta \in G_{x_0}^k} e^{2\pi i S \cdot \nabla f_{x_0} \cdot \delta}|\delta\rangle,$$

assuming $f(x_0+\delta) \approx f(x_0) + \nabla f_{x_0} \cdot \delta$ for $\|\delta\| \ll 1$. Choosing S=N/l and applying the k-dimensional inverse Quantum Fourier Transform on the resulting state, a measurement can be made in the computational basis to get an approximation of $\nabla f_{x_0}$ with precision $\epsilon = \mathcal{O}(1/N)$ and high probability. The probability depends on parameter l but an example "high" probability is a probability greater than 80%. The complexity of these gradient estimation algorithms depends on the resources used to construct the oracle of Eq. (15) and the size of $G_{x_0}^k$ used to make the approximation in Eq. (16) accurate within a desired threshold. As discussed in the next section in more detail, the computational cost of the gradient estimation method depends on the value of S=N/l. Intuitively, the cost of the method increases as the desired precision of the gradient estimate increases (larger N), and the value of l denoting the region in which the function $f$ is evaluated decreases. While the value of N is an input to the gradient estimation method controlling the desired precision, the value of l depends on the degree of non-linearity of the function $f$ in the region of evaluation around $x_0$. The more non-linear the function $f$ is around $x_0$, the smaller l may be used so that the function can be approximated by the first order Taylor expansion used in Eq. (16).

3. HIGHER-ORDER METHODS FOR QUANTUM GRADIENTS

To estimate k gradients of a function $f$ with accuracy $\epsilon$, the oracle in Eq. (15) may be evaluated $S=N/l \sim D_2\sqrt{k}/\epsilon^2$ times, where $D_2$ is an upper bound on the magnitude of the second-order derivatives off and N, l as defined in Section 2.5. While this gives a quadratically improved scaling in k, it does not improve on the error scaling of the semi-classical method. To improve also the scaling in accuracy $\epsilon$ higher-degree central-difference schemes may be used.

The 2m-point central-difference approximation for the gradient of $f$ at 0 is given by $$\nabla f_{(2m)}(0) = \sum_{\ell=-m}^{m} a_\ell^{(2m)} f(\ell x),$$

where the coefficients $a_\ell^{(2m)}$ depend on the choice of m and for uniform grid spacing one has $a_\ell^{(2m)} = -a_{-\ell}^{(2m)}$. A phase oracle for the general 2m-point scheme of Eq. (17) can be constructed by composing individual fractional phase oracles for each of the 2m terms, scaled by the appropriate coefficient $a_\ell^{(2m)}$. This leads to a family of algorithms with different phase oracles at different orders m $$O_{Sf}^m : |x\rangle \to e^{2\pi i S \sum_{\ell=-m}^{m} a_\ell^{(2m)} f(\ell x)} |x\rangle, \quad (18)$$

with S=N/1. For example, the phase oracle for the two-point approximation $$O_f^1 |x\rangle = e^{2\pi i (f(x)-f(-x))/2} |x\rangle, \quad (19)$$

can be constructed as the product of oracles $O_f^+ |x\rangle = e^{\pi i f(x)} |x\rangle$ and $O_f^- |x\rangle = e^{-\pi i f(-x)} |x\rangle$.

With these higher-order methods, estimating the gradients of a class of smooth functions (specifically, Gevrey class $G^{1/2}$ functions (a function is a Gevrey class $G^{1/2}$ function if it satisfies Eq. 20 in Theorem 1 below)) to accuracy $\epsilon$ can be done with S= $\mathcal{O}(\sqrt{k}/\epsilon)$ phase oracle applications by picking a large enough value for m (in other words, setting $$m = \log\left(\frac{c\sqrt{k}}{\epsilon}\right)$$

as further described below) in the central-difference approximation used. Therefore, for this class of smooth functions, gradient estimation using high-order central difference methods scales quadratically better in the desired accuracy $\epsilon$. This is described formally in the following Theorem:

Theorem 1 Let $x \in \mathbb{R}^k, \epsilon < c \in \mathbb{R}_+$ be fixed constants and suppose $f: \mathbb{R}^k \mapsto \mathbb{R}$ is analytic and satisfies the following: for every $j \in \mathbb{N}$ and $\alpha \in [k]^j$ $$|\partial_\alpha f(x)| \le c^j j^{j/2}. \quad (20)$$

Using the GAW Algorithm and setting m=log($c\sqrt{k}/\epsilon$) we can compute an $\epsilon$-approximate gradient $\tilde{\nabla} f(x) \in \mathbb{R}^k$ such that $$\|\nabla f(x) - \tilde{\nabla} f(x)\|_\infty \le \epsilon, \quad (21)$$

with probability at least 1−δ, using $$\tilde{\mathcal{O}}\left(\frac{c\sqrt{k}}{\epsilon} \log\left(\frac{k}{\delta}\right)\right)$$

queries to a probability or (fractional) phase oracle of $f$.

In addition to the desired $\mathcal{O}(\sqrt{k}/\epsilon)$ scaling, the complexity of the GAW algorithm in Theorem 1 includes a factor of log k/δ stemming from the fact that we extract the medians after the application of the quantum gradient estimation algorithm, with probability of 1−δ. While the following sections focus on the $\mathcal{O}(\sqrt{k}/\epsilon)$ factor to establish the dominant scaling of the complexity with respect to k, Sec. 6 shows how the log (k/δ) factor can be eliminated by using classical maximum likelihood estimation (MLE). This approach not only decreases the overall computational complexity of the algorithm, but also provides concrete confidence intervals for a given confidence level.

Table 1 summarizes the scaling in k and c of the algorithms discussed in this Section.

TABLE 1

Summary of the complexity scaling of the different market risk algorithms. Here $\epsilon$ is the absolute error in gradient estimation, and k is the dimension of the gradient. For the CFD and semi-classical methods, which depend additionally on the discretization step h, we assume the optimal choices, which are derived in Section 2.2.

| Classical Finite Difference | CFD with CRN | Semi-classical | Jordan's | GAW Quantum Gradient |
|---|---|---|---|---|
| $\mathcal{O}(k/\epsilon^3)$ | $\mathcal{O}(k/\epsilon^2)$ | $\mathcal{O}(k/\epsilon)$ | $\mathcal{O}(\sqrt{k}/\epsilon^2)$ | $\mathcal{O}(\sqrt{k}/\epsilon)$ |

3.1 Creating Phase Oracles from Probability Oracles

Because the function whose gradients are to be computed is accessible through a probability oracle in the form of Eq. (1), a corresponding phase oracle of Eq. (15) may be used. To implement the quantum gradient method described in this section using the phase oracle, a block encoding technique may be used:

Definition 1 Suppose that A is an operator on a Hilbert space $\mathcal{H}$, then we say that the unitary U acting on $\mathcal{H}_{aux} \perp \mathcal{H}$ is a block-encoding of A if A=($\langle \vec{0} | \otimes \mathbb{I}$) U($| \vec{0} \rangle \otimes \mathbb{I}$).

Intuitively, the block-encoding U is a unitary whose top-left block contains A:

$$U = \begin{bmatrix} A & \cdot \\ \cdot & \cdot \end{bmatrix}. \quad (22)$$

For the probability oracle $\mathcal{A}$ of Eq. (1)

$$(\langle 0 | \mathbb{I}) (\mathcal{A}^\dagger (Z \otimes \mathbb{I}) \mathcal{A}) (|0\rangle \otimes \mathbb{I}) = \text{diag}(1-2f(x)), \quad (23)$$

and from Definition 1, U=$\mathcal{A}^\dagger (Z \otimes \mathbb{I}) \mathcal{A}$ is a block-encoding of a diagonal matrix H with diagonal entries (1−2$f$(x)). With access to this block-encoding, a Hamiltonian simulation method (e.g., from arXiv:1610.06546v3 or arXiv: 1806.01838) allows implementation of an $\epsilon_{phase}$-approximation of the unitary $e^{itH}$, through repeated applications of U and $U^\dagger$, which scales as $\mathcal{O}(|t|+\ln(1/\epsilon_{phase}))$. Therefore, with a block encoding of $f$(x) and t=2πS, Hamiltonian simulation can be used to produce an $\epsilon_{phase}$-approximation of the phase oracle $O_{S_f}$ from Eq. (15) (as suggested earlier, an $\epsilon$-approximation of a quantity means the approximation is within error $\epsilon$ of the quantity). Note that while the block-encoding of Eq. (23) allows the creation of a phase oracle with phase of 1−2$f$(x) instead of $f$(x) in Eq. (15), the first term ends up as a global phase which can be ignored, and the factor of −2 can be absorbed in the factor t of the Hamiltonian simulation.

While Hamiltonian simulations may be used to realize the unitary evolution, some of these methods (e.g., as in arXiv: 1610.06546v3 and arXiv:1806.01838) may require post-selection, which is factored in for an end-to-end resource estimation. On the other hand, Martyn (See arXiv: 2110.11327) introduces a coherent Hamiltonian simulation method which does not require post-selection and instead succeeds with arbitrarily high probability 1−δ, scaling as $\mathcal{O}(|t|+\ln(1/\epsilon_{phase})+\ln(1/\delta))$. For a target t, approximation error $\epsilon_{phase}$ and $\delta=2\epsilon_{phase}$, this coherent Hamiltonian simulation algorithm queries U and its inverse a total number of times $$N_U(t, \epsilon_{phase}, \beta) = 2\left[\frac{1}{2}r\left(\frac{e|t|}{2\beta}, \frac{5\epsilon_{phase}}{24}\right)\right] + \gamma\left(\frac{\epsilon_{phase}}{3}, 1-\beta\right) + 1, \quad (24)$$

Where (1)$\beta \in (0, 1)$ is a user-chosen parameter; (2)$r(T,\epsilon) = |T|e^{W(\ln(1/\epsilon)/|T|)}$, where $W(x)$ is the Lambert $-W$ function; and (3) $\gamma(\epsilon, \Delta) = 2 \cdot$ $$\left[\max\left(\frac{e}{\Delta}\sqrt{W\left(\frac{8}{\pi\epsilon^2}\right)}W\left(\frac{512}{e^2\pi\epsilon^2}\right), \sqrt{2W}\left(\frac{8\sqrt{2}}{\sqrt{\pi}\Delta\epsilon}\sqrt{W\left(\frac{8}{\pi\epsilon^2}\right)}\right)\right)\right] + 1.$$

Using this method, the total number of oracle (Eq. (1)) calls used to construct an $\epsilon_{phase}$-approximation of the m-order phase oracle of Eq. (18) is then given by $$N_o = \sum_{\ell=-m}^{m} N_U\left(2\pi\frac{N}{l}|a_\ell^{(2m)}|, \epsilon_{phase}, \beta\right). \quad (25)$$

The optimal value of $\beta$ depends on the target approximation error $\epsilon_{phase}$. For the cases studied in this disclosure, $\beta=0.5$ is an improved (e.g., optimal) choice and may be used in Eq. (25).

4. RESOURCE ESTIMATION OF QUANTUM GRADIENT METHODS

This section describes an asymptotic resource estimation for the gradient methods described previously. Representative parameters from the financial domain may be used for gradient estimation problems, targeting k=1000 greeks and an approximation error of $\epsilon=10^{-3}$. For the resource estimation of the GAW method, it can be assumed that the smoothness conditions of Theorem 1, with smoothness parameter c=1, apply for the problem at hand and that the Hamiltonian simulation phase error is $\epsilon_{phase}=10^{-4}$. Here c=1 is used to estimate the possible usefulness of the algorithm in a best-case scenario of smoothness from Theorem 1. While the phase error $\epsilon_{phase}$ may be treated as a free parameter at this point, the particular choice of $10^{-4}$ is motivated by numerical simulations which show this to be a good choice. The numerical simulations and the impact of the phase error are discussed in more detail in subsequent sections. The finite-difference approximation degree may be set to $$m = \log(c\sqrt{k/\epsilon}) \quad (26)$$

and the spacing parameter set to (see proof of Theorem 5.4 from Gilyén):

$$l^{-1} = 9 \text{ cm}\sqrt{k}(81 \times 8 \times 42\pi \text{ cm}\sqrt{k/\epsilon})^{1/(2m)} \quad (27)$$

Using the proofs from Gilyén, the number of oracle calls to achieve the target error can be estimated. Notice that, in these example estimates, only the asymptotic scaling is considered (assuming remaining constant factors are 1) and it is assumed that $\epsilon_{phase}$ is sufficiently small to have no impact on performance. This results in $6.3 \times 10^7$ oracle calls.

This can be compared asymptotically to the performance of both classical finite difference (with common random numbers and without) and semi-classical quantum finite difference. These results are summarized in Table 2. In one embodiment, optimal values of the discretization step h as calculated in Section 2.2 are chosen to minimize the gradient estimation error $\epsilon$, and $\epsilon=10-3$ is picked for these benchmarks.

Table 2 illustrates that using the parameters from the proofs in Gilyén, the GAW algorithm fails to deliver an advantage compared to the semi-classical method for k as high as 103. However, while this analysis gives an indication of how the different methods compare in theory, the estimates are based on asymptotic bounds with parameters which may be loose in practice and are dependent on the smoothness of the functions considered. The following section analyzes the performance of the GAW method numerically on examples that are representative of some practical cases in finance.

TABLE 2

Table of asymptotic oracle calls used (e.g., required) to compute quantum gradients for financially relevant greeks. Parameters for this benchmark are described in the text. This asymptotic analysis indicates that quantum gradient method has potential to outperform classical finite difference methods but is on par with semi-classical methods.

| Classical Finite Difference | CFD with CRN | Semi-classical | GAW Quantum Gradient |
|---|---|---|---|
| $10^{12}$ | $10^9$ | $10^6$ | $10^7$ |

4.1 GAW Numerical Estimates

The GAW method described in Sec. 3 gives a quantum algorithm for gradient estimation which scales as $\mathcal{O}(\sqrt{k}/\epsilon)$ when the target function satisfies the conditions of Theorem 1. However, in most relevant financial models of interest, closed form solutions that can be examined to check whether they satisfy the smoothness conditions required of the theorem are not available (e.g., numerical methods are used to approximate the function of interest that does not have a closed form solution). As used herein, a closed form expression is a mathematical expression that uses a finite number of standard operations. It may include constants, variables, operations (e.g., $+ - \times \div$), and functions (e.g., nth root, exponent, logarithm, trigonometric functions, and inverse hyperbolic functions), but no limit, differentiation, or integration. In some embodiments, a function does not have a closed-form solution if numerical methods are used to (e.g., must be used to) approximate the function.

As such, this section describes numerically examining the behavior of the high-order methods of the GAW gradient estimation algorithm for two financial use cases: (a) a simple (vanilla) European call option for which there is an available analytical closed form solution allowing benchmarking of the performance of the algorithm against the exact gradients, and (b) a path-dependent basket option with a knock-in feature which has no known analytical solution and is in practice classically evaluated using Monte Carlo methods. In particular, this section examines the central-difference approximation order m and spacing l used for adequately precise gradient estimation and compare it to the theoretical values of Eq. (26) and Eq. (27) respectively. This section focuses on these two parameters because they determine the overall complexity of the algorithm, which can then be compared to the other methods of Table 2.

Because the resulting quantum circuits are prohibitively wide and deep for numerical simulation in practice, the following practical method is adopted to emulate the algorithm's performance: to estimate k greeks using n bits of precision we initialize a k*$2^n$-dimensional array with the amplitudes of Eq. (18) computed classically for the chosen derivative order m. k*$2^n$-dimensional classical inverse Fourier transforms of the array are performed to get the resulting probability distribution which is the output of the GAW algorithm before measurement. To account for the phase error $\epsilon_{phase}>0$ from the Hamiltonian simulation, a random number is added to each encoded phase in Eq. (18), uniformly picked from the interval $[-\epsilon_{phase}, \epsilon_{phase}]$.

4.1.1 Vanilla Options

A simple example in derivative pricing is a European call option whose price depends on the performance of a single asset at a pre-determined future time (the expiration date), relative to a reference price (the strike). In the Black-Scholes-Merton model, where the asset undergoes Geometric Brownian Motion (GBM), a call option on a non-dividend-paying asset has a closed form solution given by $$C = SN(d_1) - Ke^{-rT}N(d_2), \quad (28)$$

$$\text{with } d_1 = \frac{\ln(S/K) + (r + \sigma^2/2)T}{\sigma\sqrt{T}}, d_2 = d_1 - \sigma\sqrt{T},$$

where S is the asset price today, K the strike of the option, r is a risk-free rate of return, σ the annualized volatility of the asset, T is the time until the option's expiration date and N(x) denotes the CDF of the standard normal distribution. The quantum algorithm may be tested for the four greeks of this option/model: delta=∂C/∂S, rho=∂C/∂r, vega=∂C/∂σ, and theta=∂C/∂T. Numerical simulation may be performed of the GAW algorithm for increasing k (the number of greeks we compute simultaneously) and central-difference approximation order m∈[1, 4]. In each case, a search is conducted for the largest value of the spacing/for which the algorithm produces an estimate ϵ-close to the exact value with probability≥85% for each greek. We target a gradient error of $\epsilon=2\times10^{-2}$ which uses $n=[\log(1/\epsilon)]=6$ qubits in each dimension (these numerical simulations scale exponentially in this parameter as they are emulating the quantum circuit on these qubits).

For each value of k, what is numerically found as the optimal values for (m, l)—that minimize the total number of oracle calls $N_0$ from Eq. (25) while maintaining a success probability of ≥85%—is compared to those used in the proof of Theorem 1, given by Eq. (26) and Eq. (27), assuming the smoothest possible parameter c=1. The approximation error from the Hamiltonian simulation is set to $\epsilon_{phase}=10^{-4}$ and included as an error source in the numerical simulations. The gradients of the vanilla option in Eq. (28) are evaluated at the point (S, r, σ, T)=(99.5, 1%, 20%, 0.1), with K=100, chosen so that the parameter values are reasonably realistic from a finance point of view, but at the same time probing a domain where the function is as non-linear as possible (where the function is (approximately) linear then simple finite difference methods perform well already). Table 3 shows the results of the numerical simulation and the corresponding theoretical estimates from Theorem 1 and FIG. 1 shows the resulting probability distribution from the quantum gradient estimation algorithm for each greek, for the case k=4 in Table 3. To simulate the algorithm for increasing values of k, we pick k out of the four parameters S, r, σ, T with respect to which the gradients are computed and fix the values of the remaining 4-k parameters. For the cases k∈[2, 3] where there is a choice of which parameters are fixed, the simulation results in Table 3 are qualitatively independent of the choice.

FIG. 1 illustrates the probability distribution resulting from the numerical simulation of the GAW quantum gradient estimation algorithm with m=3 and l=0.58 for the four greeks (delta, rho, vega, theta) of the vanilla option of Eq. (28), and the corresponding exact values shown as dashed vertical lines. Measurement of the registers corresponding to each greek will result in a value at most $\epsilon=1/N=2\times10^{-2}$ away from the exact value with probability≥85%.

TABLE 3

This table shows (a) numerical estimates of the query complexity $N_o$ (Eq. (25)) and parameter values (m, l) used by the GAW gradient estimation algorithm in order to estimate k greeks for the vanilla option of Eq. (28) within $\epsilon = 2 \times 10^{-2}$ with probability ≥85% and (b) the corresponding values used in the proof of Theorem 1. For a vanilla option, the central-difference order can be decreased and the spacing increased by more than two orders of magnitude compared to the theoretical values. As such, the query complexity estimated numerically is ~200 times smaller than the theoretical value.

| | Numerical | | | Theoretical | | |
|---|---|---|---|---|---|---|
| K | m | l | $N_o$ | m | l | $N_o$ |
| 2 (delta, rho) | 1 | 0.65 | 1976 | 5 | 0.0028 | 570592 |
| 3 (delta, rho, vega) | 3 | 0.65 | 4664 | 5 | 0.0022 | 712008 |
| 4 (delta, rho, vega, theta) | 3 | 0.58 | 4904 | 5 | 0.0019 | 833296 |

Interestingly, Table 3 shows that the query complexity used to estimate the gradients of the vanilla option with high probability in practice, is orders of magnitude smaller than what is expected from the parameters used in proof of Theorem 1. Because the types of vanilla options explored in this section are primarily a motivating example of relevance to finance that are simpler to analyze, the following sections focus on more complex derivatives for which gradient estimation is used for business use in practice.

4.1.2 Path-Dependent Basket Options

The previous section described numerically examining the performance of the GAW algorithm for vanilla options for which there are known analytical solutions that may be used to benchmark the algorithm's performance compared to the exact gradients of the model. A similar analysis may be performed for a path-dependent option on multiple underlying assets, which has no known closed form solution, and the query complexity from the numerical simulation may be compared to the theoretical complexity from Theorem 1 as well as to that of the SQG method (Sec. 2.4) which calculates gradients using finite-difference using values estimated using QAE. Similarly to the previous section, the approximation error from the Hamiltonian simulation may be set to $\epsilon=2\times10^{-2}$.

The option considered in this section is defined on three underlying assets undergoing GBM with volatilities $\sigma_1=20\%$, $\sigma_2=20\%$, $\sigma_3=10\%$ and spot prices $\vec{S}(t=0)=(S_1(t=0)\ S_2(t=0),\ S_3(t=0))=(2.0, 2.0, 2.0)$. The risk-free rate is set to r=1% and the option expires in T=3 years. The weighted sum of the asset prices $\vec{\omega}\cdot\vec{S}(t)$ with weights $\vec{\omega}=(\omega_1, \omega_2, \omega_S)=(0.5, 0.3, 0.2)$ is observed on five days $t^B=[T/5*i]$ for i∈[1,5] across the duration of the contract and the option's payoff is given by $$f(\vec{S}(t), K, B) = \begin{cases} \max(\vec{\omega}\cdot\vec{S}(T) - K, 0), & \text{if } \vec{\omega}\cdot\vec{S}(t) > B \text{ for any } t \in t^B \\ 0, & \text{otherwise} \end{cases} \quad (29)$$

where the strike is set K=1.0 and B=2.5. This option is said to have a knock-in feature, because it only pays off (in other words, is knocked-in) if the observed weighted sum exceeds the knock-in barrier B at any of the pre-defined times before the contract's expiration. The GAW algorithm is simulated to estimate four gradients of this option contract's price V: the three deltas ($\partial V/\partial S_i$) and the vega with respect to the first asset $\partial V/\partial \sigma_1$. Because this option does not have a closed-form solution, the option is priced using classical Monte Carlo with 106 paths and use finite-difference to compute the expected gradients which we may be used as benchmarks for the quantum algorithm. The quantum algorithm may be simulated using n=4 qubits for each gradient register, which sets the target error of the algorithm to $\epsilon \leq \frac{1}{2}^4 = 0.0625$. Using m=1 and l=0.25 the simulated GAW algorithm gives us an $\epsilon$-close estimate with probability 85% for each greek. The SQG method uses $1/\epsilon$ calls to the $Q$ operator of QAE, and each $Q$ includes two calls to the unitary $\mathcal{A}$ of Eq. (1) and its inverse, therefore the complexity for k greeks is $2k/\epsilon$. Because the SQG method computes the payoff twice in order to construct the finite difference (Eq. (14)), the $\mathcal{A}$ operator is approximately twice as large as the regular pricing oracle. To compare the query complexity more accurately with the other quantum methods, a factor of two in the complexity may be included, for a total of $4k/\epsilon$.

Table 4 shows the query complexity and parameters from the numerical simulation of the GAW method for this path-dependent basket option, along with (a) the asymptotic estimates from Theorem 1, (b) the query complexity of the SQG method and (c) the query complexity of the CFD and CFD-CRN methods, all for the same target approximation error. For the CFD and CFD-CRN methods, the reported query complexity is the total number of Monte Carlo paths used for the evaluation of the k greeks within the target approximation error $\epsilon$ with probability 85%, computed numerically. The table also includes the parameters and resources used for the same calculation using the Simulation-Free Quantum Gradient (SFQG) algorithm described in the next section. The resulting probability distribution for all greeks along with the MC-estimated "true" values is shown in FIG. 2.

Figure 2:
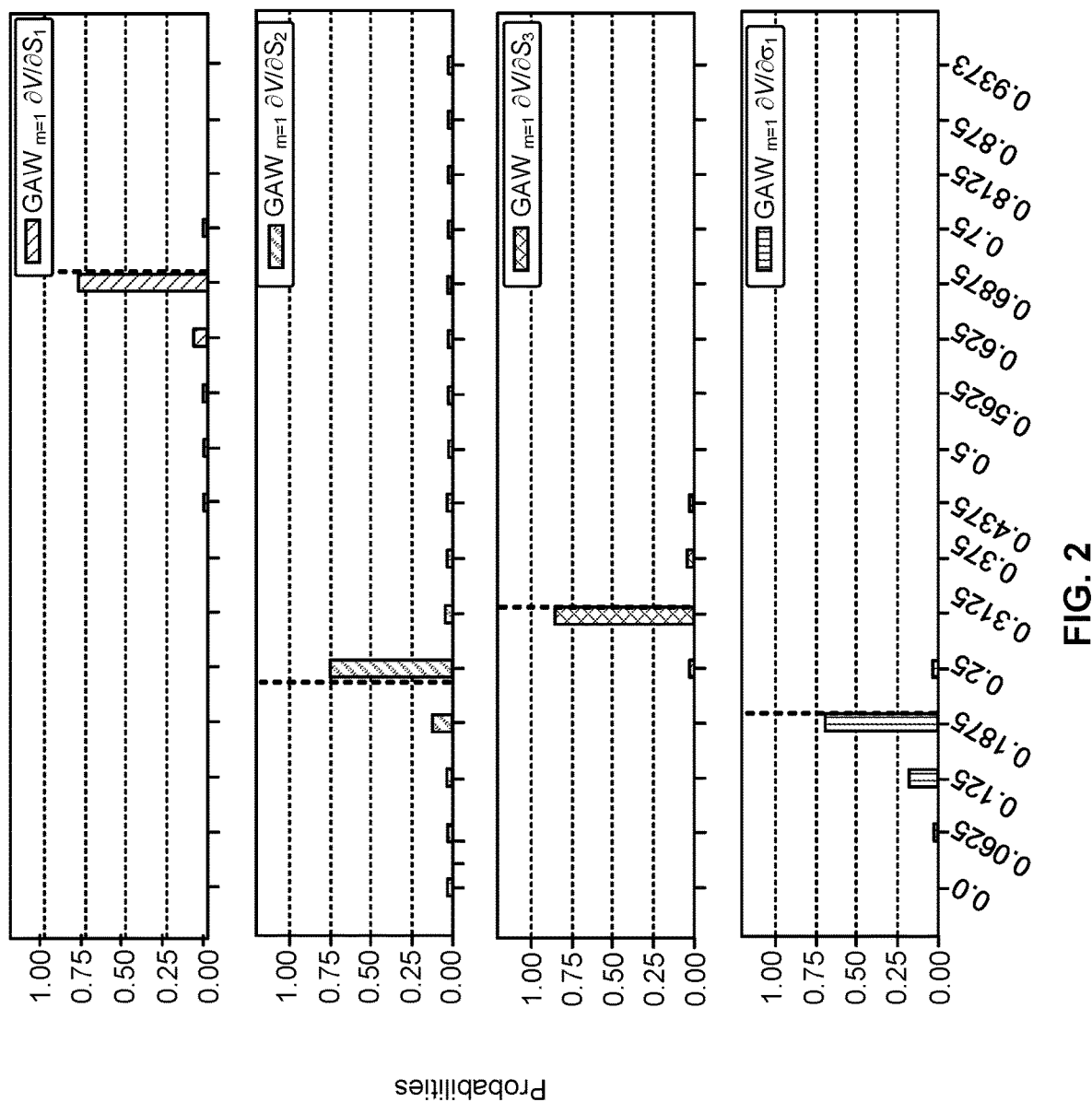
FIG. 2 illustrates an example probability distribution resulting from a second numerical simulation of a quantum gradient algorithm.

FIG. 2 illustrates the probability distribution resulting from the numerical simulation of the GAW quantum gradient estimation algorithm with m=1 and l=0.25 for the four greeks of the path-dependent basket option of Sec. 4.1.2, along with the values estimated using classical Monte Carlo (MC) with $10^6$ paths (vertical dashed lines). Measurement provides estimates for each greek with error $\epsilon \leq 0.0625$ with probability$\geq$85%.

5. SIMULATION-FREE QUANTUM GRADIENT (SFQG) METHOD

This section describes construction of a second-order accurate quantum gradient algorithm, corresponding to m=1 in Eq. (17). This is higher order than Jordan's algorithm (Jordan's algorithm has unfavorable complexity scaling), but lower order than required from the analysis in Gilyén to guarantee the $\mathcal{O}(\sqrt{k}/\epsilon)$ scaling. A benefit is that, in the case of derivative pricing, we provide an explicit construction of the phase oracle without using block encoding or Hamiltonian simulation. This may be referred to as the Simulation-Free Quantum Gradient (SFQG) method.

To describe this construction, this section first shows how to turn the derivative pricing setting of Sec. 1.1 into a first-order phase oracle $O_{S_f}$ and then how to build a second-order extension to construct $O_{S_f}^1$ as defined in Eq. (18). This algorithm can be simulated to estimate the greeks of the basket option from Sec. 4.1.2, allowing comparison of its performance to the corresponding second-order accurate GAW method.

5.1 First-Order Pricing Phase Oracle

To apply the quantum gradient algorithms to estimate the gradient of a function $f(x)$, a phase oracle of the form of Eq. (15) may be constructed. This oracle can be evaluated on a superposition of points x in a k-dimensional hypercube of edge length l, $G^k = [-l/2, l_2]^k$ around $x_0$, where each dimension is discretized using N points with n=log N qubits and l chosen small enough so that $f(x)$ is approximately linear in that region (so that the approximation in Eq. 16 holds). For simplicity, let $x_0 = 0$ as gradient estimation at other points can be achieved by redefining the function $f$. Evaluating the $\mathcal{A}$ operator of Eq. (1) on all points x in superposition gives:

$$\frac{1}{\sqrt{N^k}} \sum_x |x\rangle|0\rangle_{q+1} \xrightarrow{\mathcal{A}} \frac{1}{\sqrt{N^k}} \sum_x |x\rangle(\sqrt{1-f(x)}|\psi_0\rangle_q|0\rangle + \quad (30)$$

$$\sqrt{f(x)}|\psi_1\rangle_q|1\rangle) = \frac{1}{\sqrt{N^k}} \sum_x |x\rangle(|\psi_+(x)\rangle - |\psi_-(x)\rangle)$$

where $|\psi_\pm(x)\rangle \mathbb{I} = -i e^{\pm i\theta(x)}|\psi_\pm(x)\rangle \mathbb{I}/\sqrt{2}$ and $f(x) = \sin^2(\theta(x))$, similarly to Eq. (3). Now, define the Grover operator $Q = \mathcal{A} S_0 \mathcal{A}^\dagger S_{\psi_0}$, where $S_0 = \mathbb{I}^{\otimes nk} \otimes () - 2|0\rangle\mathbb{I}_{q+1}\langle 0|_{q+1})$ and $S_{\psi_0}(\mathbb{I} - 2|\psi_0\rangle_q|0\rangle\langle 0|\langle\psi_0|_q)$. Let D be an upper bound on $|(\partial\theta(x)/\partial x_i)|$ for all $i \in [1,k]$ and apply the $Q$ operator $\pi S$ times to the state in Eq. (30) with S=N/Dl to get[1]

[1] Because the states $|\Psi\pm(x)\rangle$ in Eq.(31) depend on x, care is typically taken to ensure that they do not interfere with the phase kicked back to the |x⟩ register. As discussed in Section 9, the structure of the $\mathcal{A}$ operator used in derivative pricing allows the phase kickback to take place correctly.

$$Q^{\pi S}\mathcal{A}: \frac{1}{\sqrt{N^k}} \sum_x |x\rangle|0\rangle_{q+1} \rightarrow \frac{1}{\sqrt{N^k}} \sum_x e^{2\pi i S\theta(x)}|x\rangle|\psi_+(x)\rangle - \quad (31)$$

$$\frac{1}{\sqrt{N^k}} \sum_x e^{-2\pi i S\theta(x)}|x\rangle|\psi_-(x)\rangle.$$

Note that the application of $O_{S_\theta} \equiv Q^{\pi S}\mathcal{A}$ in Eq. (31) is close to the desired phase oracle for quantum gradient estimation, but (i) for $\theta$ rather than $f$, and (ii) with a superposition over the positive and negative phases that are sought.

An inverse Quantum Fourier Transform $(\mathcal{F}_n^{-1})^{\otimes k}$ on the first register gives an estimate of the derivatives of $\theta(x)$ at $x_0$ $$\left|\frac{N}{D}\frac{\partial\theta}{\partial x_1}\right\rangle\left|\frac{N}{D}\frac{\partial\theta}{\partial x_2}\right\rangle \cdots \left|\frac{N}{D}\frac{\partial\theta}{\partial x_k}\right\rangle \quad (32)$$

$$\text{or } \left|-\frac{N}{D}\frac{\partial\theta}{\partial x_1}\right\rangle\left|-\frac{N}{D}\frac{\partial\theta}{\partial x_2}\right\rangle \cdots \left|-\frac{N}{D}\frac{\partial\theta}{\partial x_k}\right\rangle.$$

This method gives an oracle for $\theta$ and not for $f$ directly. However, because $\theta$ and $f$ are related through $f(x) = \sin^2(\theta(x))$, the derivatives of $\theta$ may be computed and the chain rule applied to get the gradients of $f$:

$$\pm\left.\frac{\partial f}{\partial x_i}\right|_{x_0} = \pm\left.\frac{\partial\theta}{\partial x_i}\right|_{x_0} \times \sin(2\theta(x_0)). \quad (33)$$

This uses knowledge of $\theta(x_0)$ which may be calculated through QAE via the operator of Eq. (1).

The positive and negative cases can be distinguished by adding a dummy dimension to $f$ with a gradient that has a known sign. For example, one can transform the function ($f$: $\mathbb{R}^k \mapsto \mathbb{R}$) $\mapsto$ ($f+0.5x_{k+1}$: $\mathbb{R}^{k+1} \mapsto \mathbb{R}$). Inspecting the sign of the k+1-th derivative tells us if we are in the positive or negative case.

Because in this setting the value of $\pi S=\pi N/Dl$ indicates the number of times the $\mathcal{Q}$ operator in Eq. (31) is invoked, it must be expressible as an integer. Since $N=2^n$ is an integer, this can be achieved by picking a value of D such that $\pi/Dl$ is also an integer. After application of the $\mathcal{Q}$ operator, the resulting integral number of times, the measured gradients in Eq. (32) are classically multiplied by the choice of D to recover the magnitude of the gradients.

5.2 Second-Order Pricing Phase Oracle

Figure 3:
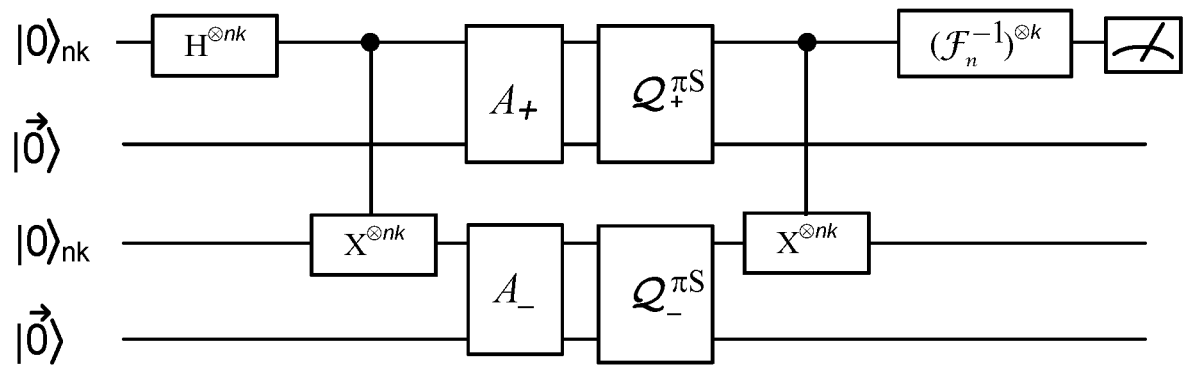
FIG. 3 illustrates an example quantum circuit diagram of a Simulation-Free Quantum Gradient (SFQG) algorithm.

A possible high-order extension is to construct an oracle which encodes the two-point approximation shown in Eq. (19), which corresponds to m=1 in Eq. (17). Because in the QAE setting the gradients of $\theta(x)=\sin^{-1}\sqrt{f(x)}$ are computed instead of $f(x)$, the constructed oracle may perform:

$$O_{S\theta}^1 |x\rangle = e^{2\pi i S(\theta(x)-\theta(-x))/2}|x\rangle, \quad (34)$$

where $\theta(-x)=\sin^{-1}\sqrt{f(-x)}$. In general, high-order oracles of this form may be constructed as the product of two separate oracles with opposite phases. This idea can be used to construct the oracle of Eq. (34) using appropriately defined oracles. Let $\mathcal{A}_+$ label the $\mathcal{A}$ operator of Eq. (1) and define operator $\mathcal{A}_-$ which acts as a probability oracle for the value $f(-x)$ $$\mathcal{A}_-: |\vec{0}\rangle |x\rangle \to (\sqrt{1-f(-x)}|\psi_0(-x)\rangle |0\rangle \mathcal{A}_+ + \sqrt{f(-x)}|\psi_1(-x)\rangle |1\rangle )|x\rangle, \quad (35)$$

as well as corresponding Grover operators $\mathcal{Q}_+=\mathcal{A}_+ S_0 \mathcal{A}_+^\dagger S_{\psi_0}$ and $\mathcal{Q}_-=\mathcal{A}_- S_0 \mathcal{A}_-^\dagger S_{\psi_0}$. From Eq. (31) we see that the product of the oracles $O_{S\theta}^+ \equiv \mathcal{Q}_+^{\pi S} \mathcal{A}_+$ and $O_{S\theta}^- \equiv \mathcal{Q}_-^{\pi S} \mathcal{A}_-$ generates the state $$\frac{1}{\sqrt{N^k}}\sum_x e^{2\pi i S(\theta(x)-\theta(-x))}|x\rangle|\psi_1(x)\rangle + \quad (36)$$

$$\frac{1}{\sqrt{N^k}}\sum_x e^{-2\pi i S(\theta(x)-\theta(-x))}|x\rangle|\psi_2(x)\rangle +$$

$$\frac{1}{\sqrt{N^k}}\sum_x e^{2\pi i S(\theta(x)+\theta(-x))}|x\rangle|\psi_3(x)\rangle +$$

$$\frac{1}{\sqrt{N^k}}\sum_x e^{-2\pi i S(\theta(x)+\theta(-x))}|x\rangle|\psi_4(x)\rangle$$

where $\psi_i$ denotes products of eigenstates of $\mathcal{Q}_+$ and $\mathcal{Q}_-$ which can then be ignored for the rest of the algorithm. While the first two terms include the appropriate phase kickback (up to the sign) for the two-point approximation method of Eq. (34) with combined probability of 50%, the last two terms encode a phase proportional to $\theta(x)+\theta(-x)=\theta(x_0)+\mathcal{O}(\partial^2\theta(x)/\partial x^2)$, which create a probability peak around zero instead of the gradient, with similar combined 50% probability. By adding a dummy variable to the function as described at the end of Sec. 5.1, we can distinguish which eigenstate we are in by measuring the gradient of the dummy variable after applying the inverse Quantum Fourier Transform. Because the gradient with respect to the dummy variable is known by construction, measuring the positive (negative) gradient of the dummy variable means measuring the positive (negative) gradient with respect to the other variables. Otherwise, if zero is measured in the dummy variable register, that measurement may be ignored. This means that additional post-processing is used for this method, and 50% of the shots are discarded. The total number of shots used depends on the desired accuracy of the estimation and this choice is discussed in more detail in Sec. 6. A circuit diagram of the SFQG method is shown in FIG. 3. Note that the operators $\mathcal{Q}_+$ and $\mathcal{Q}_-$ are applied to separate registers in order to generate the correct phases for Eq. (36).

FIG. 3 illustrates a quantum circuit diagram of the SFQG method used to generate the state of Eq. (36). First, Hadamard gates are applied to k registers of n qubits each to generate the superposition of points $\Sigma_x |x\rangle$. CNOT gates (controlled by qubits in the first set of k registers of n qubits) are then used to create a copy of each $|x\rangle$ (in a second set of k registers of n qubits), which allows evaluation of the oracles $O_{S\theta}^+ \equiv \mathcal{Q}_+^{\pi S}\mathcal{A}_+$ and $O_{S\theta}^- \equiv \mathcal{Q}_-^{\pi S}\mathcal{A}_-$ in parallel at the cost of extra qubits. After uncomputing the copies using another set of CNOT gates (controlled by qubits in the first set of k registers of n qubits), an n-dimensional inverse Quantum Fourier Transform is applied to each of the initial k registers in the first set to give the state of Eq. (36) which is then measured to estimate the k gradients.

Using the operator to construct the state of Eq. (36), numerical simulation may be used on the SFQG algorithm to compute the greeks of the basket option of Sec. 4.1.2. In this case, the algorithm is used to compute the gradients $\partial\theta/\partial S_1$, $\partial\theta/\partial S_2$, $\partial\theta/\partial S_3$, $\partial\theta/\partial\sigma_1$, where $\theta=\sin^{-1}\sqrt{V}$, and V is the option price, from which the option's greeks can be estimated using Eq. (33), assuming the contract is already priced. Similar to the simulation of the GAW algorithm in Sec. 4.1.2, a search is performed for the parameter value l which estimates the gradients within $\epsilon \leq 0.0625$ with probability of success $\geq 85\%$, using n=4 qubits for each gradient register. Here, the probability of obtaining the states discarded in Eq. (36) in post-processing can be ignored. Intuitively, one can think of the effective oracular cost as being twice what is computed from this simulation given that there is a 50% probability of failure, but as shown in Sec. 6, there is a more efficient way of combining measurement results to obtain estimates and confidence intervals for the gradients. The complexity of the algorithm in terms of the number of serial invocations to the $\mathcal{A}$ operator of Eq. (1) used to construct the state of Eq. (36) is then $\pi S=\pi N/l$, where $N=2^n$.

Figure 4:
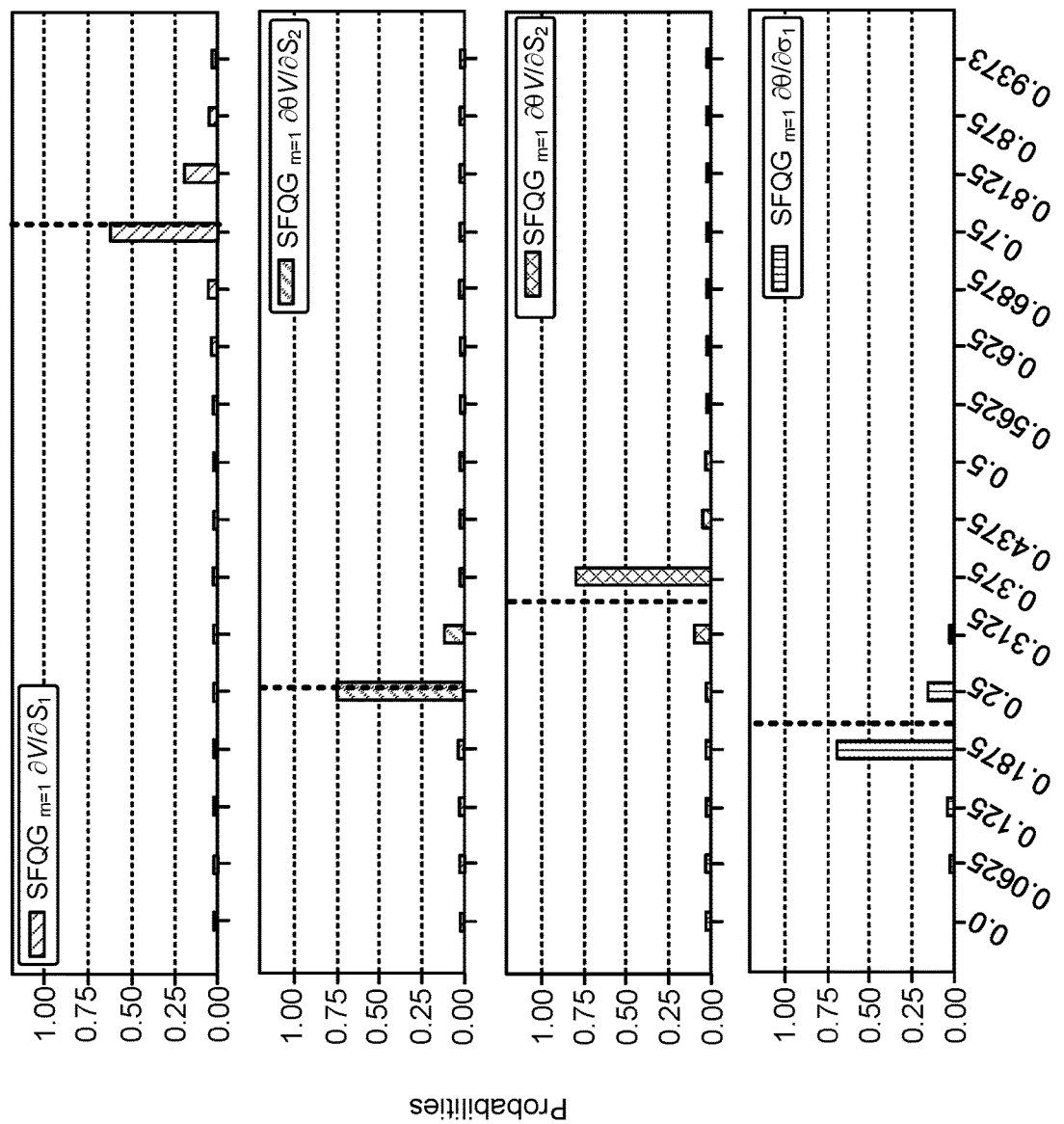
FIG. 4 illustrates an example probability distribution resulting from a numerical simulation of the SFQG algorithm.

The probability distribution in the non-discarded states for all four gradients after the application of the SFQG algorithm is shown in FIG. 4, and the parameter values and query complexity of the algorithm is shown in Table 4 along with the other quantum, classical, and semi-classical methods studied in this disclosure. The classical method complexity is estimated by computing the greeks with finite-difference using 3000 Monte Carlo simulations of the basket option price and searching for the number of Monte Carlo paths which give the same target error $\epsilon \leq 0.0625$ with probability $\geq 85\%$ as the quantum and semi-classical methods.

FIG. 4 illustrates the probability distribution resulting from the numerical simulation of the second-order accurate, SFQG algorithm with m=1 and l=0.25 for the four greeks of the path-dependent basket option of Sec. 4.1.2, along with the exact values estimated using classical Monte Carlo simulation (vertical dashed lines). This algorithm allows estimation of the gradients of the function $\theta-\sin^{-1}\sqrt{V}$, where V is the option price, from which the option's greeks can then be estimated using Eq. (33). Similar to FIG. 2, measurement gives estimates for each greek within error $\epsilon \leq 0.0625$ with probability $\geq 85\%$.

TABLE 4

Comparison between (a) the numerical estimates of the query complexity $N_o$ (Eq. (25)) and parameter values (m, l) used by the GAW gradient estimation algorithm in order to estimate k greeks for the basket option of Eq. (29) within $\epsilon \leq 0.0625$ with probability $\geq$ 85%, (b) the corresponding theoretical values used in the proof of Theorem 1, (c) the parameters and resources used for the same calculation using the Simulation-Free Quantum Gradient (SFQG) algorithm described in Sec. 5, (d) the query complexity of an SQG method for the same target accuracy and confidence interval and (e) the total number of simulated classical Monte Carlo paths used for the same accuracy and confidence interval using CFD and CFD-CRN methods.

|  |  | $N_o$ | m | l |
|---|---|---|---|---|
| Quantum | Simulation-Free (SFQG)* | 201 | 1 | 0.25 |
|  | Semi-classical (SQG) | 256 | n/a | n/a |
|  | GAW (Numerical) | 1600 | 1 | 0.25 |
|  | GAW (Theoretical) | 201,528 | 4 | 0.0018 |
| Classical | Finite-Difference w/CRN (CFD-CRN) | 32,000 | n/a | n/a |
|  | Finite-Difference (CFD) | 400,000 | n/a | n/a |

Numerically it can be demonstrated that for this path-dependent basket option, the m=1 GAW method can estimate the four greeks within E with probability 85%, with 125 times smaller query complexity implied by the proof of Theorem 1 and 20 times smaller than the best finite-difference-based classical method (CFD-CRN). (* For the SFQG method, the effective oracular cost can be thought of as being twice what is reported in this table given that there is a 50% probability of failure, but as shown in Sec. 6. there is a more efficient way of combining measurement results to obtain estimates and confidence intervals.)

6. QUANTUM GRADIENT ESTIMATION USING MAXIMUM LIKELIHOOD ESTIMATION

The success of the quantum gradient estimation algorithms studied in this disclosure (e.g., the SFQG methods), as well as those in Jordan and Gilyén, may be judged by their ability to estimate the gradient within $\epsilon$ with high probability. In Gilyén the authors suggest repeating the gradient estimation algorithm $\mathcal{O}(\log(k/p))$ times for k gradients and taking the median to get the estimates within error $\epsilon$ with probability at least $(1-\varphi)$. However, this approach has two main drawbacks: a) it doesn't characterize the correctness of the output with precise confidence intervals, and b) the output can only be one of the N possible values of the discretized hypercube $G_{x_0}^k$ of Eq. (16). These issues may apply to amplitude estimate algorithms as well.

Maximum Likelihood Estimation (MLE) may address these issues for amplitude estimation algorithms. For example, the quantum circuits are sampled more than once and the results are classically post-processed with MLE. This section shows that we can additionally apply the MLE method to the quantum gradient estimation algorithms to enhance the final estimate.

Given a probability distribution p with unknown parameter g and data $x_i$ with i=1, . . . , M sampled from it, MLE may obtain an estimate $\hat{g}$ for g. This is done by maximizing the log-likelihood log L, where $\log L(g') = \log(\Pi_{i=1}^M p(x_i|g'))$ and g' are candidates to be evaluated:

$$\hat{g} = \operatorname*{argmax}_{g'} \log L(g')g' = \qquad (37)$$

$$\operatorname*{argmax}_{g'} \log \left( \prod_{i=1}^M p(x_i|g') \right) = \operatorname*{argmax}_{g'} \left( \sum_{i=1}^M \log p(x_i|g') \right),$$

which measures how likely it is to measure the data $x_i$ if g' is the true parameter. The general quantum gradient estimation algorithm from Section 2.5 uses a region l where the function whose gradients we are computing is approximately linear. In this case, the probability distribution after the inverse Quantum Fourier Transform is applied to Eq. (16) is the same as that of phase estimation and is given by:

$$p(x) = \frac{\sin^2(N\Delta\pi)}{N^2\sin^2(\Delta\pi)}, \qquad (38)$$

where $\Delta=(x-g')$ and N is the number of possible measurements.

Confidence intervals for the MLE estimate $\hat{g}$ can be derived using the likelihood ratio (LR). The confidence interval at the $(1-\alpha)$ confidence level is the value g' satisfying $\{g' \in [0, 1]: \log L(g') \geq \log L(\hat{g}) - q_{\chi_1^2}(1-\alpha)/2\}$, where $q_{\chi_1^2}$ denotes the $(1-\alpha)$ quantile of the $\chi^2$ distribution.

Figure 5A:
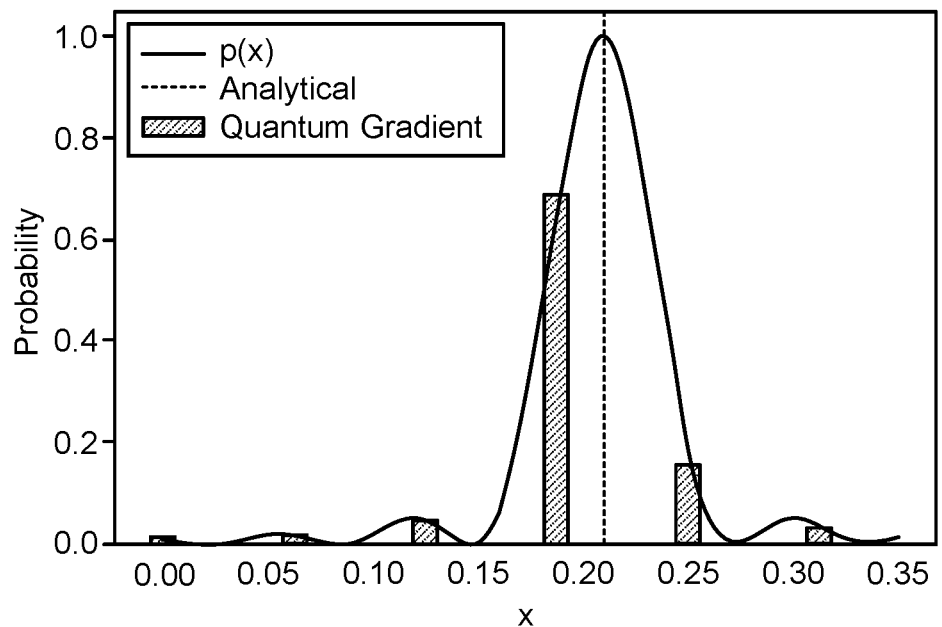
FIG. 5a illustrates an example discrete probability distribution for the basket option from FIG. 4.

FIG. 5a illustrates the discrete probability distribution before measurement of Vega $\partial\theta/\partial\sigma$ for the basket option from FIG. 4 (bars) is fitted to the theoretical distribution p(x) of Eq. 38) (solid line). The maximum of the distribution occurs at the exact analytical value (dashed vertical line).

Figure 5B:
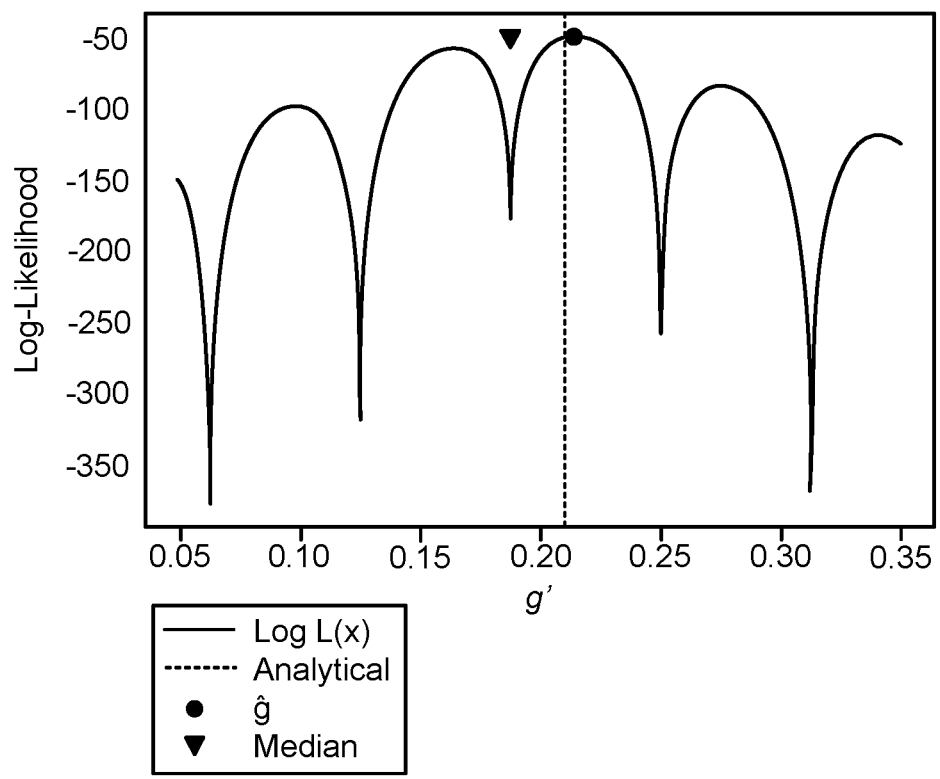
FIG. 5b illustrates an example log-likelihood plot for the basket option from FIG. 4.

FIG. 5b illustrates a global maximum of the log-likelihood log L(g') (dot) which provides a better estimate of the true value (dashed vertical line) than the most likely result if we sample from the probability distribution and take the median (triangle). The log-likelihood plot was produced by sampling the quantum gradient estimation circuit 30 times and allows us to estimate this greek to within $\epsilon \leq 2 \times 10^{-3}$ with confidence level $1-\alpha=0.68$. When using the SFQG method we have 50% probability of discarding a measurement, and the expected number of shots for this target accuracy is thus 60.

FIGS. 5a and 5b show how MLE can be used to improve the estimate of Vega $(\partial\theta/\partial\sigma)$ for the basket option from FIG. 4 calculated with the simulation-free quantum gradient (SFQG) method. As discussed in Section 5.2, the SFQG method generates a probability peak of 50% around the gradient up to the sign and another peak of 50% around zero which we ignore. Because this approach can distinguish between these cases by adding a dummy variable to the function with a known gradient, just the case where the gradient is measured may be considered and the number of shots may be doubled to take into account the discarded measurements. FIG. 5a shows that the final probability distribution after the application of the quantum gradient estimation algorithm (labeled "Quantum Gradient") does indeed fit Eq. (38) (plotted in FIG. 5a and labeled "p(x)"), and thus the QAE with MLE results can be used here too. For clarity, the measurement outcomes are only plotted in the interval which contains most of the probability mass.

FIG. 5b plots the log-likelihood log L(g') as a function of g' across the same interval when the quantum gradient circuit that produces the probability distribution in FIG. 5a is sampled 30 times. In FIG. 5a, the MLE estimate $\hat{g}$ (dot) is the global maximum of the function (labeled "Log L(x)"), which is very close to the true value g (vertical dotted line) and significantly better than the median of the final probability distribution (triangle). In practice, the SFQG method may use double the number of shots (60) to account for the discarded shots due to the extra terms of Eq. (36).

One significant advantage of the MLE method is that because the final estimate is not constrained to be one of the N possible discrete values, the value of N may be decreased at the cost of increasing the number of samples taken, thus lowering the overall width and depth of the quantum circuit. For instance, while the distance between the N possible discrete values in FIG. 5a is 0.0625, the error $\epsilon$ in the MLE estimate in FIG. 5b is $\epsilon=4\times10^{-3}$.

While the MLE post-processing uses additional classical compute cost, calculating the MLE in this setting is done by increasing (e.g., maximizing) a concave function over a one-dimensional compact interval, which can be ignored in the overall complexity analysis.

7. UPDATED ESTIMATES FOR QUANTUM ADVANTAGE

The resource estimation of Chakrabarti established that quantum advantage for derivative pricing with respect to classical Monte Carlo methods requires a quantum processor that can execute $\sim 10^7$ T-gates per second at a code distance that can support $\sim 10^{10}$ logical operations. More specifically, pricing the autocallable contract studied in Chakrabarti using the reparameterization technique introduced therein to within $\epsilon \leq 2\times 10^{-3}$ with confidence level $1-\alpha=0.68$ requires a T-depth of $5\times 10^7$. As such, in order to match the classical Monte Carlo pricing time estimated as 1 second, a logical quantum clock may use a rate of 50 MHz. The same reparameterization technique from Chakrabarti may be used to construct oracle size estimates and estimate the T-depth of the quantum circuit for the SFQG method to compute the four greeks of the basket option of Sec. 4.1.2 and Table 4. To calculate the greeks to within the same $\epsilon \leq 2\times 10^{-3}$ and confidence level $1-\alpha=0.68$, the SFQG method may be used with the parameters of FIG. 4 and the maximum likelihood estimation (MLE) method from Sec. 6 using 60 shots (see FIG. 5b). Using these parameters provides an estimate that the total T-depth of the SFQG circuit multiplied by the number of shots is $5.5\times 10^7$, with the end-to-end circuit using 12k logical qubits and execution of T-gates at a code distance that can support 108 logical operations. Assuming the contract can be classically priced using Monte Carlo in 1 second to within the same error and confidence level and that the greeks can be calculated using a second-order finite-difference method applied to Monte Carlo pricings, the greeks of the basket option can be classically estimated in 8 seconds (four greeks, two pricings per greek). Therefore, quantum advantage using the SFQG method in calculating the greeks of this derivative contract may include executing T-gates at a rate of 7 MHz, which is 7 times lower than the estimate of Chakrabarti for quantum advantage in derivative pricing. Moreover, because the quantum gradient circuit is sampled 60 times when the MLE method is used (see FIG. 5), providing parallel access to 60 QPUs on which the quantum circuit can be loaded and sampled simultaneously enables achieving the same runtime as the serial execution if the logical cock rate of each device is $\sim 100$ kHz, which is closer to current estimates of feasible logical clock rates around 10 kHz.

While the computational cost for the numerical simulations of the SFQG method currently limits the analysis to a maximum of k=4 greeks for practically relevant use cases, the SFQG method can scale favorably to derivative pricing problems of higher dimensionality, motivated by the fact that most, if not all, derivative contracts of practical interest have piecewise-linear payoffs. While Theorem 1 provides a complexity of $\mathcal{O}(\sqrt{k}/\epsilon)$ for the class of functions considered, it does not preclude higher-order speedups with respect to k for smoother functions. For instance, the SFQG method applied to simple polynomial functions can achieve a complexity of $\mathcal{O}(\log(k)/\epsilon)$. Derivative contracts often include market parameters with little or no cross-dependence, e.g., $\partial^n f/(\partial x_1^m \partial x_2^{n-m}) \sim 0$ for $n>1$, $m \in [1, n-1]$. For example, the basket option from Sec. 4.1.2 without the knock-in feature $\partial^n V/(\partial S_i^m \partial S_j^{n-m})=0$. The absence of such higher-order terms allows us to pick values of m and l in the application of the SFQG method which lead to smaller overall oracular cost than what is specified by Theorem 1. An example upper bound on the potential advantage compared to classical Monte Carlo is the case where the function is at most a second-degree polynomial in all k variables, yielding an overall speedup of $\mathcal{O}(k)$. Therefore, the possible extent of quantum speedup of the SFQG method may be dependent on the nature of the price function for each derivative. Assuming the SFQG method can be applied to larger number of k (as argued above), then one or more of the above advantages may apply to the GAW m=1 method as well. However, the SFQG method is still cheaper to construct than the GAW method, as indicated by Table 4.

8. PHASE KICKBACK

For the Simulation-Free Quantum Gradient (SFQG) method described in Sec. 5, care may be taken for the appropriate phase kickback to occur in Eq. (31) (e.g., to get the correct gradient after the application of the inverse Quantum Fourier Transform). Eq. (31) includes the states $|\omega_\pm(x)\rangle$ which in general interferes with the subsequent inverse Quantum Fourier Transform through their dependence on x. The application of the $\mathcal{Q}$ operator in the SFQG method creates the state $$|\psi\rangle = \frac{1}{\sqrt{N^k}}\sum_x e^{2\pi i S\theta(x)}|x\rangle|\psi_+(x)\rangle - \frac{1}{\sqrt{N^k}}\sum_x e^{-2\pi i S\theta(x)}|x\rangle|\psi_-(x)\rangle. \quad (39)$$

Applying the inverse Quantum Fourier Transform to the $|x\rangle$ register gives $$\frac{1}{N^k}\sum_x\sum_y e^{2\pi i (S\theta(x)-x\cdot y/N)}|y\rangle|\psi_+(x)\rangle - \frac{1}{N^k}\sum_x\sum_y e^{-2\pi i (S\theta(x)-x\cdot y/N)}|y\rangle|\psi_-(x)\rangle. \quad (40)$$

The probability of measuring a value $|z\rangle$ in the first register is given by $$\frac{1}{N^{2k}}\left(\sum_{x'}\sum_{y'} e^{-2\pi i \left(S\theta(x')-x'\cdot\frac{y'}{N}\right)}\right. \quad (41)$$

$$\left\langle y'|\langle\psi_+(x')| - \sum_{x'}\sum_{y'} e^{2\pi i \left(S\theta(x')-x'\cdot\frac{y'}{N}\right)}\langle y'|\langle\psi_-(x')|\right)\bigg(|z\rangle\otimes\mathbb{1}\bigg)\bigg(\langle z|\otimes\mathbb{1}\bigg)$$

$$\left(\sum_x\sum_y e^{2\pi i (S\theta(x)-x\cdot y/N)}|y\rangle|\psi_+(x)\rangle\right)\left(\sum_x\sum_y e^{2\pi i (S\theta(x)-x\cdot y/N)}|y\rangle|\psi_-(x)\rangle\right) =$$

$$\frac{1}{N^{2k}}\left(\sum_x\sum_y e^{-2\pi i (S\theta(x')-x'\cdot z/N)}e^{2\pi i (S\theta(x)-x\cdot z/N)}\langle\psi_+(x')|\psi_+(x)\rangle +\right.$$

-continued $$\sum_{x'}\sum_{y'} e^{2\pi i(S\theta(x')-x'\cdot z/N)} e^{-2\pi i(S\theta(x)-x\cdot z/N)} \langle \psi_-(x') | \psi_+(x) \rangle -$$

$$\sum_{x'}\sum_{y'} e^{-2\pi i(S\theta(x')-x'\cdot z/N)} e^{-2\pi i(S\theta(x)-x\cdot z/N)} \langle \psi_+(x') | \psi_-(x) \rangle -$$

$$\sum_{x'}\sum_{y'} e^{2\pi i(S\theta(x')-x'\cdot z/N)} e^{-2\pi i(S\theta(x)-x\cdot z/N)} \langle \psi_-(x') | \psi_+(x) \rangle \Bigg)$$

In the derivative pricing context considered in this disclosure, the $\mathcal{A}$ operator may implement a re-parameterization method (e.g., the re-parameterization method in Chakrabarti). To do this, the $\mathcal{A}$ operator can be written as the product of two operators $\mathcal{G}$ and $\mathcal{F}$. The $\mathcal{G}$ operator loads standard normal distributions corresponding to the number of assets of the derivative contract and the timesteps used in the pricing $$\mathcal{G}: |0\rangle_m \to \sum_i \sqrt{p_i} |i\rangle, \quad (42)$$

where the probabilities $p_i$ are independent of any market parameters. Then, the $\mathcal{F}$ operator computes the payoff $g(i)$ using quantum arithmetic on $|i\rangle$, which is subsequently rotated into the amplitude of an ancilla qubit $$\mathcal{F}: \sum_i \sqrt{p_i} |i\rangle |0\rangle_q \to \sum_i \sqrt{p_i} |i\rangle |g(i)\rangle (\sqrt{1-g(i)}|0\rangle + \sqrt{g(i)}|1\rangle). \quad (43)$$

After the final rotation, the register $|g(i)\rangle$ can be uncomputed, so that the overall effect of the $\mathcal{A} = \mathcal{F}(\mathcal{G} \otimes \mathcal{A}^{\otimes q})$ operator can be written as $$\mathcal{A}|0\rangle_{m+1} = \sum_i \sqrt{p_i} |i\rangle(\sqrt{1-g(i)}|0\rangle + \sqrt{g(i)}|1\rangle) \quad (44)$$

where $g(i) \in [0,1]$. When $\mathcal{A}$ is evaluated in superposition over a register $|x\rangle$ representing tweaks to input market parameters as shown in Eq. (30), the resulting state becomes $$\mathcal{A}: \frac{1}{\sqrt{N^k}}\sum_x |x\rangle|0\rangle_{m+1} \to \frac{1}{\sqrt{N^k}}\sum_x |x\rangle \sum_i \sqrt{p_i} |i\rangle(\sqrt{1-g(i,x)}|0\rangle + \sqrt{1+g(i,x)}|1\rangle) = \frac{1}{\sqrt{N^k}}\sum_x |x\rangle(e^{i\theta(x)}|\psi_+(x)\rangle - e^{-i\theta(x)}|\psi_+(x)\rangle) \quad (45)$$

with $$|\psi_\pm(x)\rangle = \frac{1}{\sqrt{2}}\Bigg(\sum_i \sqrt{p_i}|i\rangle(-i\sqrt{\frac{g(i,x)}{\sum_i p_i g(i,x)}}|1\rangle \pm \quad (46)$$

$$\sqrt{\frac{1-g(i,x)}{\sum_i p_i(1-g(i,x))}}|0\rangle)\Bigg),$$

and $$\theta(x) = \arcsin\Bigg(\sqrt{\sum_i p_i g(i,x)}\Bigg) \quad (47)$$

where k is the dimension of the gradient we are estimating, and $N=2^n$, and n qubits are used for the superposition $\Sigma_x |x\rangle$ in each dimension. Choosing $x \ll 1$ means that the function $\theta(x)$ is approximately linear in the vicinity of $x=0$. In this regime, the $|\psi_\pm x\rangle$ states in Eq.(46) give $\mathbb{I}\psi_+(x')|\psi_-(x)\rangle = \mathbb{I}\psi_-(x')|\psi_+(x)\rangle \approx 0$ and $\mathbb{I}\psi_+(x')|\psi_+(x)\rangle = \mathbb{I}\psi_-(x')|\psi_-(x)\rangle \approx 1$. The probability of measuring a value $|z\rangle$ in Eq.(41) is then given by $$\frac{1}{N^{2k}}\sum_{x'}\sum_x e^{-2\pi i(S\theta(x')-x'\cdot z/N)}e^{2\pi i(S\theta(x)-x\cdot z/N)} = \frac{1}{N^{2k}}\Bigg|\sum_x e^{2\pi i(S\theta(x)-x\cdot z/N)}\Bigg|^2 \quad (48)$$

which is similar to the standard quantum phase estimation. Note that the application of the $\mathcal{Q}$ operator in Eq. (39) induces the correct phase kickback to the $|x\rangle$ register because the x-dependence in Eq. (46) is limited to the amplitude of the last qubit. If the probabilities $p_i$ become dependent on x or other qubit registers remain entangled with x, the phase kickback fails.

Figure 6:
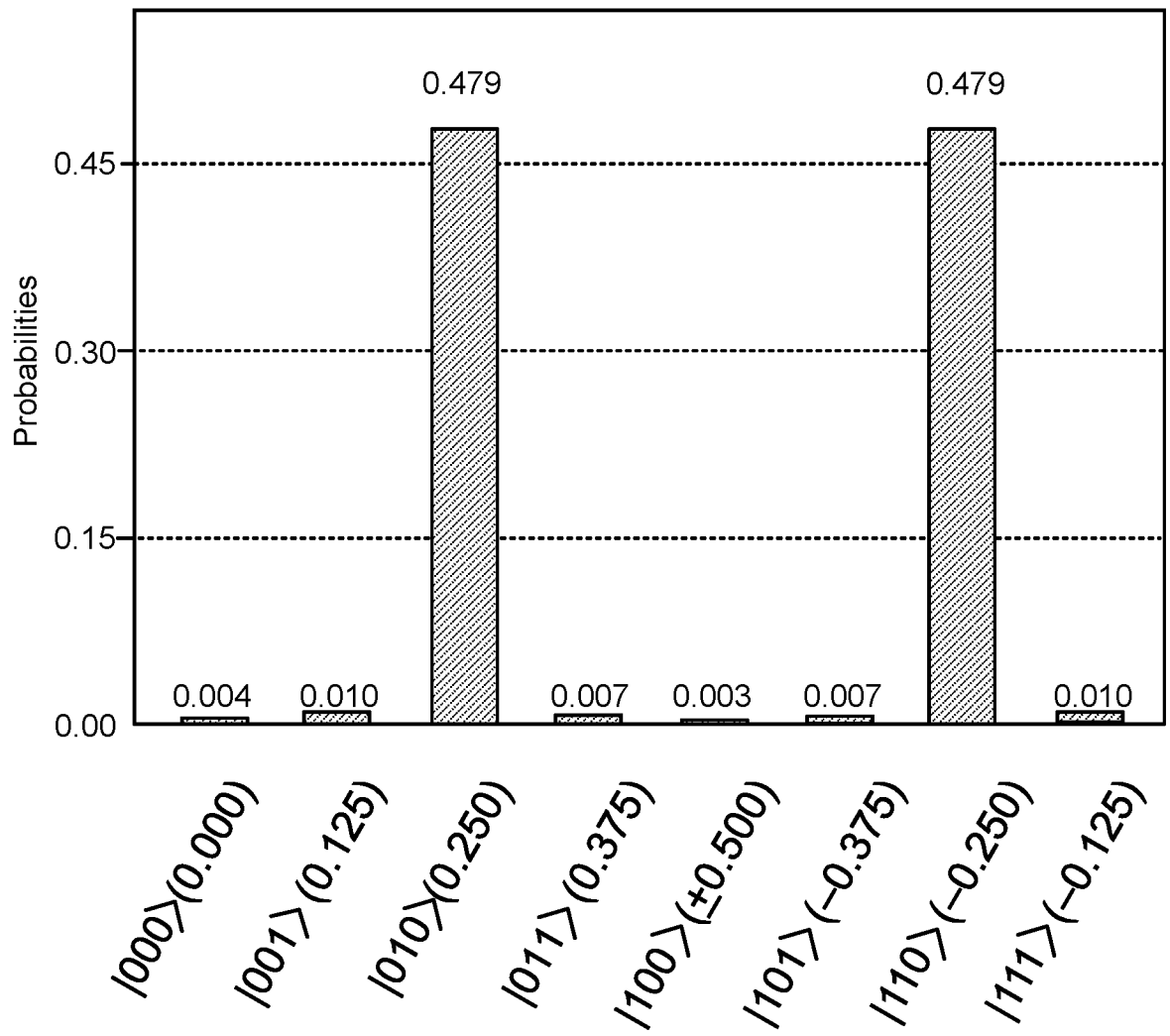
FIG. 6 illustrates example simulated measurement outcomes.

FIG. 6 shows that the simulated measurement outcomes after the creation of the state in Eq. (39) and the subsequent inverse Quantum Fourier Transform for an example when the $\mathcal{A}$ operator is in the form of Eq. (45) and k=1. The probabilities $p_i$ are taken from a normal distribution with unit variance defined on three qubits (m=3), normalized such that $\Sigma_i p_i=1$, and $g(i,x)=\sin^2(b*i+2x)$ for b=0.405. After applying the Quantum Fourier Transform and measuring the $|x\rangle$ register, an estimate can be obtained of the gradient $d\theta/dx$ (or $-d\theta/dx$ as described by Eq.(32)) at x=0 where $\theta=\arcsin(\sqrt{a})$ and $a=\Sigma_i p_i \sin^2(b*i+2x)$. For the parameter values chosen, $d\theta/dx \approx 0.253$ at x=0. Three qubits may be used for the register $|x\rangle$ (n=3) which allows resolution of the gradient with accuracy $\frac{1}{8}=0.125$. The value of b was chosen for clarity, so that the resulting gradient is close to one of the values which can be represented exactly with three qubits. $l=\pi/256$ and D=1 may be picked and thus the $\mathcal{Q}$ operator may be applied S=N/Dl=2048 times. Because the $\mathcal{A}$ operator used in this simulation is in the form of Eq. (45), the correct phase is kicked back to the $|x\rangle$ register, and the inverse Quantum Fourier Transform generates two probability peaks around $\pm d\theta/dx$ where $d\theta/dx \approx 0.253$.

FIG. 6 illustrates simulated measurement outcomes after the application of Eq. (31) and the subsequent inverse Quantum Fourier Transform when the $\mathcal{A}$ operator is in the form of Eq. (45). The measurement outcomes correspond to estimates of the gradient $d\theta/dx$ at x=0 where $\theta=\arcsin(\sqrt{a})$ and $a=\Sigma_i p_i \sin^2(b*i+2x)$ for b=0.405 and p=[0.03149738, 0.08388914, 0.16118575, 0.22342773, 0.22342773, 0.16118575, 0.08388914, 0.03149738]. The probability peaks around $\pm 0.25$, which is the closest value representable with n=3 qubits to the expected $d\theta/dx \approx 0.253$.

9. AUTOMATIC DIFFERENTIATION AND MULTI-OBJECTIVE QAE

Another way to compute gradients (e.g., in the considered setting) is automatic differentiation (AD). AD repeatedly applies the chain rule to every elementary arithmetic operation that is used to compute an objective function and keeps track of the analytical gradient throughout the calculation. In many practical applications the gradient can be computed at a constant overhead, independent of the dimension. In some cases, the overhead can even be stated to be bounded by a factor of four compared to evaluating the function alone at the expense of larger memory requirements.

Suppose one wants to estimate an expectation value $\mathbb{E}(g(S, x))$ for a payoff function g, a random variable S and some given parameters x as well as the corresponding gradient $\nabla_x \mathbb{E}(g(S, x))$.

To construct the probability oracle $\mathcal{A}(x)$ used by QAE for a fixed x, one can first create a weighted superposition of (e.g., all) scenarios, then evaluate the corresponding payoff for each scenario, and prepare an objective qubit to get $$\sum_{j=0}^{2^m-1} \sqrt{p_j} |s_j\rangle |g(s_j, x)\rangle (\sqrt{1 - g(s_j, x)}|0\rangle + \sqrt{g(s_j, x)}|1\rangle) \quad (49)$$

such that the probability of measuring $|1\rangle$ in the last qubit corresponds to $\mathbb{E}(g(S, x))$, and where the $s_j$ denote the possible realizations of S represented by m qubits and the $p_j$ denote the corresponding probabilities.

For every scenario $|s_j\rangle$, quantum arithmetic can be applied to compute the payoff $|g(s_j, x)\rangle$. Thus, for each $s_j$, AD can be used in the same way as classically to compute the gradient $\nabla_x g(s_j, x)$, while using at most twice the resources used classically due to the use of a reversible implementation. Thus, with a constant overhead compared to the evaluation of the expectation value, this results in the state $$\sum_{j=0}^{2^m-1} \sqrt{p_j} |s_j\rangle |g(s_j, x)\rangle \bigotimes_{i=1}^{k} |\partial_i g(s_j, x)\rangle. \quad (50)$$

The following shows how to use QAE to read out multiple objectives defined on the same random variables, which then immediately applies to the gradient as constructed in Eq. (50).

Suppose a random variable S and a set of functions $f_i$, i=1, ..., k, that map realizations of S to $\mathbb{R}$. Further, suppose one is interested in estimating the expectation values $\mathbb{E}(f_i(S))$ for all i, and that one can construct a state of the form $$\sum_{j=0}^{2^m-1} \sqrt{p_j} |s_j\rangle \bigotimes_{i=1}^{k} |f_i(s_j)\rangle. \quad (51)$$

To estimate the values $\mathbb{E}(f_i(S))$, first introduce k additional m-qubit registers $|c_i\rangle$, each initialized with some value $c_i$, and second, use quantum arithmetic to compute the sum $$\sum_{i=1}^{k} c_i f_i(s_j) \quad (52)$$

into another register. In other words, an operator can be constructed that acts as $$\bigotimes_{i=1}^{k} |c_i\rangle |0\rangle \bigotimes_{i=1}^{k} |0\rangle |0\rangle \mapsto \bigotimes_{i=1}^{k} |c_i\rangle \sum_{j=0}^{2^m-1} \sqrt{p_j} |s_j\rangle \bigotimes_{i=1}^{k} |f_i(s_j)\rangle \left| \sum_{i=1}^{k} c_i f_i(s_j) \right\rangle. \quad (53)$$

By adding an objective qubit and applying a rotation controlled by the last register, this can also be used to construct a probability oracle $\mathcal{A}(c)$ that corresponds to the function $$f(c) = \mathbb{E}\left(\sum_{i=1}^{k} c_i f_i(S)\right). \quad (54)$$

This is a linear function in c and using the quantum gradient algorithm with respect to c results in $$\nabla_c f(c) = (\mathbb{E}(f_1(S)), \ldots, \mathbb{E}(f_k(S)))^T, \quad (55)$$

which is the read out of all k expectation values.

If the values of $f_i$ are such that the weighted sum in Eq. (52) satisfies $\Sigma_{i=1}^{k} c_i f_i(s_j) \le 1$, since the function by construction is linear in c, the resulting complexity of the quantum gradient algorithm for a target accuracy $\epsilon > 0$ scales as $\mathcal{O}(1/\epsilon)$, independent of k (ignoring logarithmic terms). The multi-objective QAE uses (e.g., requires) k·m additional qubits as well as the weighted sum in Eq. (52), which can be computed in logarithmic depth by using a divide-and-conquer summation scheme. If on the other hand, Eq. (52) is normalized by dividing the weighted sum with a factor D, the complexity of the algorithm becomes $\tilde{\mathcal{O}}(1/\epsilon D)$. When $f_i \sim 1$, $\forall i$, we may choose D~1/k, which adds a factor of k back to the complexity of the algorithm, negating the advantage of this method.

Since Eq. (50) has the desired (e.g., required) shape, the multi-objective QAE can be applied to evaluate the gradient that has been evaluated using AD implemented by quantum arithmetic. If no additional normalization is desired (e.g., required), AD and (multi-objective) QAE can be combined to get the gradient algorithm with runtime $\tilde{\mathcal{O}}(1/\epsilon)$, independent of the dimension and with a quadratic speed-up in the accuracy. Thus, like classically, AD is a promising approach to estimate market risks with a significant advantage over finite difference schemes.

10. DISCUSSION

Among other things, this disclosure provides a new application of the GAW algorithm and a new modification to the GAW algorithm. Specifically, this disclosure describes using a modified version of the GAW algorithm (m=1) to compute gradients of financial derivatives (greeks)(even if it is unclear whether the functions of interest satisfy Theorem 1). For example, as shown in Table 4, while theory of the GAW algorithm dictates that m should be 4, this disclosure demonstrates that m=1 can be used. This demonstrates that additional quantum advantage is possible in risk analysis, on top of the quadratic speedup of derivative pricing. Classically computing k greeks with finite-difference methods—when the underlying derivative is priced using Monte Carlo—has complexity $\mathcal{O}(k/\epsilon^2)$ and straightforward extension of finite-difference methods to derivative pricing using amplitude estimation provides a quadratic advantage with complexity $\mathcal{O}(k/\epsilon)$. In this disclosure, the modified GAW algorithm provides an additional quadratic advantage for overall complexity of $\mathcal{O}(\sqrt{k}/\epsilon)$. Theorem 1 specifies this quadratic advantage with respect to the number of greeks when the pricing function satisfies the smoothness conditions of Theorem 1. However, because derivative pricing problems of practical interest in finance involve numerous diverse multivariate price functions and generally have no analytical solutions, understanding whether and which financial derivatives satisfy the aforementioned smoothness conditions may be a challenging task. For this reason, numerical methods were employed to simulate the modified GAW algorithm for two example derivatives: a) a European call option which has a closed-form solution and is used to establish the validity and benchmarks of the algorithm and b) a path-dependent basket option which has no known analytical solution and is representative of typical derivative price functions. The results not only succeed in estimating the associated greeks for these examples with high probability, but the resulting query complexity is significantly smaller than that suggested by Theorem 1 (e.g., See Tables 3 and 4).

This disclosure also provides a rigorous resource estimation of the quantum oracles involved in the above modified GAW algorithm. Due to the extra cost associated with the block-encoding and Hamiltonian simulation used to approximately construct the phase oracle of Eq. (15) from the probability oracle of Eq. (1) used in derivative pricing, Sec. 5 of this disclosure develops new methods (the SFQG methods) to construct a cheaper, second-order (m=1) phase oracle by taking advantage of the structure of amplitude estimation.

Sec. 6 shows that quantum gradient algorithms (e.g., the SFQG methods) may be enhanced by employing maximum likelihood estimation (MLE), allowing us to determine the resources used to estimate gradients with precise confidence intervals and confidence levels. Using this MLE method, Sec. 7 describes estimating the resources used for quantum advantage in derivative market risk for typical use cases of practical interest. Employing quantum gradient methods in derivative pricing can lower the logical clock rate estimate for quantum advantage described in Chakrabarti (arXiv: 2012.03819) by a factor of seven.

While finite-difference methods may be used to compute greeks, classical automatic differentiation (AD) methods may also be used. AD methods may be advantageous because of their ability to significantly reduce the associated computational costs, at the cost of increased memory footprint. In particular, the adjoint mode of automatic differentiation (AAD) in certain cases allows the computation of all k gradients of a scalar function $f$ at a cost which is independent of k, meaning that the overall classical complexity cost in this case becomes $\mathcal{O}(\omega/\varepsilon^2)$, for some constant co depending on the function $f$. For example, while the complexity of the GAW quantum gradient estimation algorithm scales as $\mathcal{O}(\sqrt{k}/\epsilon)$ for the class of smooth functions in Theorem 1, in Sec. 4.1 we saw that for practical use cases in finance, the algorithm scales 100×-200× times better than the theoretical estimate from Theorem 1 for a given $\epsilon$ (e.g., See Tables 3 and 4). As such, depending on the practical scaling of the GAW algorithm to larger values of k for finance use cases, it is possible that it could also outperform the complexity of AAD methods. Note that if the GAW algorithm outperforms AD, then the SFQG methods do as well. However, SFQG methods can outperform AD even if the GAW algorithm does not, since SFQG methods are cheaper than GAW as shown in the examples studied. It is also interesting to consider whether a similar construct as that employed by AD can be applied in a quantum setting. Section 9 provides such a construct and shows that in certain settings it can lead to similar performance profile as classical AD, in that the runtime of the algorithm is independent of the number of greeks at the expense of increased memory usage.

Although this disclosure describes calculating gradients, the teachings herein may also be applicable to other useful risk metrics, such as the computation of portfolio value-at-risk (VaR). For example, based on the results described herein, further quantum advantage in the derivative pricing subroutine may be leveraged at these higher levels of calculation and aggregation.

11. EXAMPLE METHOD

FIG. 7 is a flow chart illustrating a method 700 (in accordance with the SFGQ methods) for determining a gradient of a function $f(x)$ describing a quantity of a resource, according to an embodiment. For example, the method may be for determining a gradient of a price function for a product, such as a financial derivative (e.g., a greek). The steps of the method 700 may be performed in different orders, and the method 700 may include different, additional, or fewer steps. In the example of FIG. 7, the steps of the method 700 are performed by a computing system (e.g., including a classical computing system (e.g., 810) and a quantum computing system (e.g., 820)).

The computing system receives 705 a function $f(x)$ describing a quantity of a resource, where x represents a set of k parameters of the quantity. In some embodiments, $f(x)$ does not have a closed form solution (e.g., numerical methods are used to approximate $f(x)$) or $f(x)$ is not a Gevrey class $G^{1/2}$ function. The function $f(x)$ may be determined within an error $\epsilon_p$ by using a quantum computing system (e.g., of the computing system) to repeatedly execute a quantum function algorithm (e.g., a quantum pricing algorithm). The quantum function algorithm may scale as $\mathcal{O}(1/\epsilon_p)$. The quantum function algorithm may be a quantum amplitude estimation algorithm.

A quantum computing system of the computing system repeatedly executes 710 a quantum gradient algorithm to determine a k-dimensional gradient of the function $f(x)$ within an error $\epsilon$ at point $x_0$. The quantum gradient algorithm includes a phase oracle $O_{Sf}^m$ defined by a finite difference approximation with an order greater than zero. A complexity of the quantum gradient algorithm scales as $\mathcal{O}(\sqrt{k}/\epsilon)$. In some embodiments, the quantum gradient algorithm scales better (e.g., less) than as $\mathcal{O}(\sqrt{k}/\epsilon)$ (e.g., see Sec. 5.2, Table 4, and FIG. 4, where m=1 is used instead of m=4 (Theorem 1 dictates m=4 should be used). Since a smaller value of m can be used, the function is smoother that a Gevrey class $G^{1/2}$ function and can thus scale better than $\mathcal{O}(\sqrt{k}/\epsilon)$. Determining the k-dimensional gradient of the function $f(x)$ may include performing a maximum likelihood estimation (MLE) or performing automatic differentiation.

The phase oracle $O_{Sf}^m$ may be given by: $O_{Sf}^m : |x\rangle \to e^{2\pi i S \sum_{l=-m}^{m} a_l^{(2m)} f(lx)} |x\rangle$, where m is the finite-difference approximation order greater than zero, $|x\rangle$ is a k-dimensional vector representing the set of k parameters, S is a scaling factor controlling the accuracy of the finite-difference approximation, and $a_l^{(2m)}$ are coefficients of the finite-difference approximation of order m. In some embodiments, $m < \log(c\sqrt{k}/\epsilon)$, where c is a smoothness parameter of a Gevrey class $G^{1/2}$ function (this may occur when the function is smoother than a Gevrey class $G^{1/2}$ function (as defined in Theorem 1). See also Sec. 5.2, Table 4, and FIG. 4, where m=1 is used instead of m=4 (Theorem 1 dictates m=4 should be used). Since a smaller value of m can be used, the function is smoother that a Gevrey class $G^{1/2}$ function and can thus scale better than $\mathcal{O}(\sqrt{k}/\epsilon)$. For example, m=1.

In some embodiments, executing the quantum gradient algorithm comprises executing a quantum circuit on qubits of the quantum computing system. Executing the quantum circuit may include: (1) applying a first quantum unitary operator to qubits in a first register and in a second register, the first unitary operator given by $\mathcal{A}_+:|\vec{0}\rangle|x\rangle \rightarrow (\sqrt{1-f(x)}|\psi_0(x)\rangle|0\rangle + \sqrt{f(x)}|\psi_1(x)\rangle|1\rangle)|x\rangle$, where $|\psi_0(x)\rangle$ and $|\psi_1(x)\rangle$ are normalized quantum states; and (2) applying a second quantum unitary operator to qubits in a third register and in a fourth register, the second unitary operator given by $\mathcal{A}_-:|\vec{0}\rangle|x\rangle \rightarrow (\sqrt{1-f(-x)}|\psi_0(-x)\rangle|0\rangle + \sqrt{f(-x)}|\psi_1(-x)\rangle|1\rangle)|x\rangle$, where $|\psi_0(-x)\rangle$ and $|\psi_1(-x)\rangle$ are normalized quantum states. The first and second unitary operators may be applied in parallel to the respective qubits. Executing the quantum circuit may further include: (1) subsequent to applying the first unitary operator, applying a third quantum unitary operator to qubits in the first register and in the second register, the third unitary operator given by $\mathcal{Q}_+ = \mathcal{A}_+ S_0 \mathcal{A}_+^\dagger S_{\psi_0}$, where $S_0 = \mathbb{I} - 2|\vec{0}\rangle\mathbb{I}\langle\vec{0}|$ and $S_{\psi_0} = \mathbb{I} - 2|\psi_0(x)\rangle|0\rangle\mathbb{I}\langle 0|\mathbb{I}\langle\psi_0(x)|$; and (2) subsequent to applying the second unitary operator, applying a fourth quantum unitary operator to qubits in the third register and in the fourth register, the fourth unitary operator given by $\mathcal{Q}_- = \mathcal{A}_- S_0 \mathcal{A}_-^\dagger S_{\psi_0}$. The third and fourth unitary operators may be applied in parallel to the respective qubits. The third unitary operator may be applied multiple times to qubits in the first register and in the second register, and the fourth unitary operator may be applied multiple times to qubits in the third register and in the fourth register. For example, the third and fourth unitary operators are each applied $\pi^*S$ times, where $S=N/Dl$. Executing the quantum circuit may further include: (1) prior to applying the first unitary operator, applying Hadamard gates to qubits in the first register of qubits (e.g., to each qubit in the first register); (2) prior to applying the second unitary operator, applying controlled NOT (CNOT) gates to qubits in the third register (e.g., to each qubit in the third register), the CNOT gates controlled by qubits in the first register; and (3) subsequent to applying the third and fourth unitary operators, applying CNOT gates to qubits in the third register (e.g., to each qubit in the third register), the CNOT gates controlled by qubits in the first register. Executing the quantum circuit may further include applying an inverse quantum Fourier Transform to qubits in the first register. After the quantum circuit is executed, the quantum state of qubits on the first register may be measured.

After the gradient of the function $f(x)$ is determined, the computing system may transmit instructions to purchase the resource, sell the resource, or adjust a hedging of a portfolio including the resource based on the gradient.

12. DESCRIPTION OF A COMPUTING SYSTEM

Embodiments described in the disclosure above may be implemented using one or more computing systems. Example computing systems are described below.

Figure 8A:
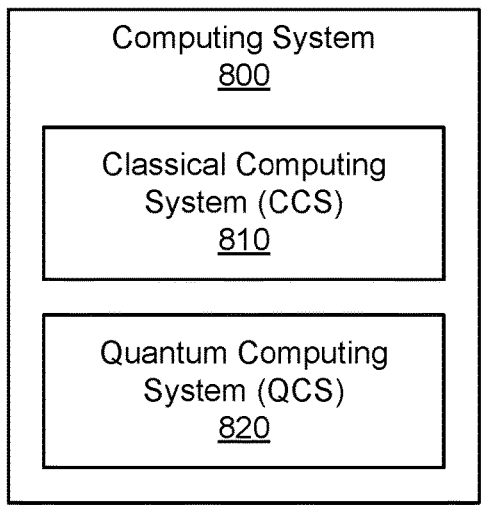
FIGS. 8A-8B are block diagrams that illustrate a computing system, according to one or more embodiments.
Figure 8B:
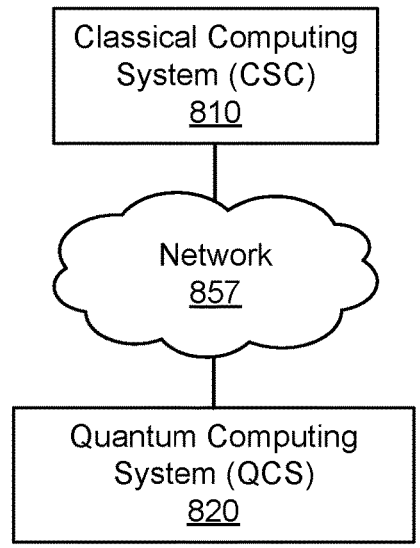

FIG. 8A is a block diagram that illustrates an embodiment of a computing system 800. In the example of FIG. 8A, the computing system 800 includes a classical computing system 810 (also referred to as a non-quantum computing system) and a quantum computing system 820, however a computing system may just include a classical computing system or a quantum computing system. An embodiment of the classical computing system 810 is described further with respect to FIG. 9. While the classical computing system 810 and quantum computing system 820 are illustrated together, they may be physically separate systems. For example, FIG. 8B illustrates an example cloud computing architecture where the computing system 810 and the quantum computing system 820 communicate via a network 857. The computing system 800 may include different or additional elements than illustrated (e.g., multiple quantum computing systems 820). In addition, the functions may be distributed among the elements in a different manner than described.

The classical computing system 810 may control the quantum computing system 820. For example, the classical computing system 810 generates and transmits instructions for the quantum computing system 820 to execute a quantum algorithm or quantum circuit. Although only one classical computing system 810 is illustrated in FIG. 8A, any number of classical computing system 810 or other external systems may be connected to the quantum computing system 820.

Figure 8C:
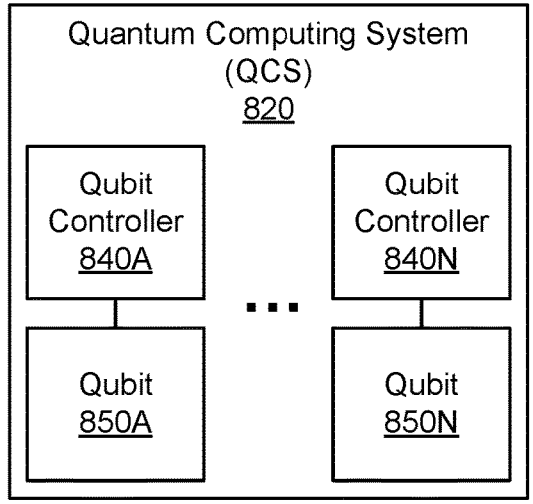
FIGS. 8C-8D are block diagrams that illustrate embodiments of a quantum computing system.
Figure 8D:
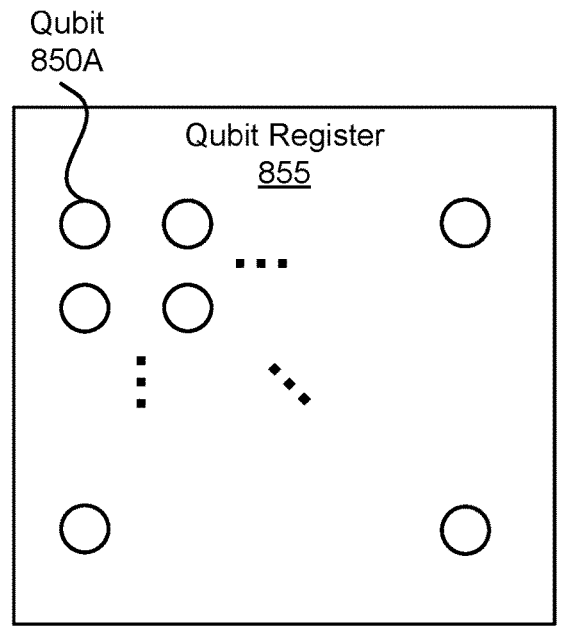

FIG. 8C is a block diagram that illustrates an embodiment of the quantum computing system 820. The quantum computing system 820 includes any number of quantum bits ("qubits") 850 and associated qubit controllers 840. As illustrated in FIG. 8D, the qubits 850 may be in a qubit register of the quantum computing system 820 (or multiple registers). Qubits are further described below. A qubit controller 840 is a module that controls one or more qubits 850. A qubit controller 840 may include a classical processor such as a CPU, GPU, or FPGA. A qubit controller 840 may perform physical operations on one or more qubits 850 (e.g., it can perform quantum gate operations on a qubit 840). In the example of FIG. 8C, a separate qubit controller 840 is illustrated for each qubit 850, however a qubit controller 850 may control multiple (e.g., all) qubits 850 of the quantum computing system 820 or multiple controllers 850 may control a single qubit. For example, the qubit controllers 850 can be separate processors, parallel threads on the same processor, or some combination of both.

Figure 8E:
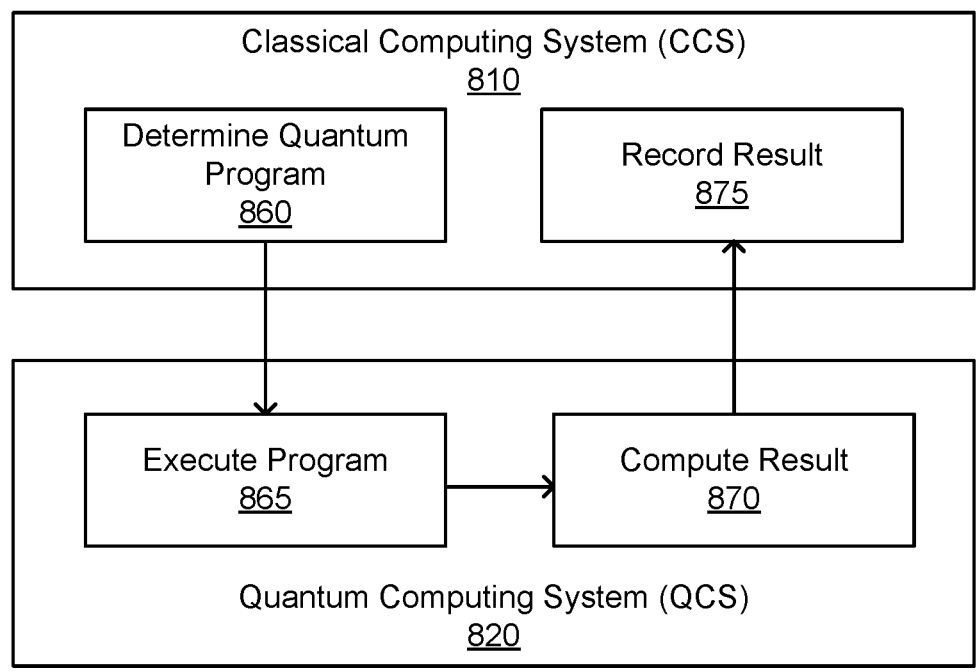
FIG. 8E is a flow chart that illustrates an example execution of a quantum routine on the computing system.

FIG. 8E is a flow chart that illustrates an example execution of a quantum routine on the computing system 800. The classical computing system 810 generates 860 a quantum program to be executed or processed by the quantum computing system 820. The quantum program may include instructions or subroutines to be performed by the quantum computing system 820. In an example, the quantum program is a quantum circuit. The quantum computing system 820 executes 865 the program and computes 870 a result (referred to as a shot or run). Computing the result may include performing a measurement of a quantum state generated by the quantum computing system 820 that resulted from executing the program. Practically, this may be performed by measuring values of one or more of the qubits 850. The quantum computing system 820 typically performs multiple shots to accumulate statistics from probabilistic execution. The number of shots and any changes that occur between shots (e.g., parameter changes) may be referred to as a schedule. The schedule may be specified by the program. The result (e.g., quantum state data) (or accumulated results) is recorded 875 by the classical computing system 810. Results may be returned after a termination condition is met (e.g., a threshold number of shots occur). The classical computing system 810 may determine a quantity based on the received results.

The quantum computing system 820 exploits the laws of quantum mechanics in order to perform computations. A quantum processing device (QPU), a quantum computer, a quantum processor, and a quantum processing unit are each examples of a quantum computing system. The quantum computing system 800 can be a universal or a non-universal quantum computing system (a universal quantum computing system can execute any possible quantum circuit (subject to the constraint that the circuit doesn't use more qubits than the quantum computing system)). In some embodiments, the quantum computing system 800 is a gate model quantum computer. As previously described, quantum computing systems use so-called qubits, or quantum bits (e.g., 850A). While a classical bit always has a value of either 0 or 1, a qubit is a quantum mechanical system that can have a value of 0, 1, or a superposition of both values. Example physical implementations of qubits include superconducting qubits, spin qubits, trapped ions, arrays of neutral atoms, and photonic systems (e.g., photons in waveguides). For the purposes of this disclosure, a qubit may be realized by a single physical qubit or as an error-protected logical qubit that itself comprises multiple physical qubits. Additionally, the disclosure is not specific to qubits. The disclosure may be generalized to apply to quantum computing systems 820 whose building blocks are qudits (d-level quantum systems, where d>2) or quantum continuous variables, rather than qubits.

A quantum circuit is an ordered collection of one or more gates. A sub-circuit may refer to a circuit that is a part of a larger circuit. A gate represents a unitary operation performed on one or more qubits. Quantum gates may be described using unitary matrices. The depth of a quantum circuit is the least number of steps used to execute the circuit on a quantum computing system. The depth of a quantum circuit may be smaller than the total number of gates because gates acting on non-overlapping subsets of qubits may be executed in parallel. A layer of a quantum circuit may refer to a step of the circuit, during which multiple gates may be executed in parallel. In some embodiments, a quantum circuit is executed by a quantum computing system. In this sense, a quantum circuit can be thought of as comprising a set of instructions or operations that a quantum computing system can execute. To execute a quantum circuit on a quantum computing system, a user may inform the quantum computing system what circuit is to be executed. A quantum computing system may include both a core quantum device and a classical peripheral/control device (e.g., a qubit controller 840) that is used to orchestrate the control of the quantum device. It is to this classical control device that the description of a quantum circuit may be sent when one seeks to have a quantum computer execute a circuit.

The parameters of a parameterized quantum circuit may refer to parameters of the gates. For example, a gate that performs a rotation about the y axis may be parameterized by a real number that describes the angle of the rotation.

The description of a quantum circuit to be executed on one or more quantum computing systems may be stored in a non-transitory computer-readable storage medium. The term "computer-readable storage medium" should be taken to include a single medium or multiple media (e.g., a centralized or distributed database, or associated caches and servers) able to store instructions. The term "computer-readable medium" shall also be taken to include any medium that is capable of storing instructions for execution by the quantum computing system and that cause the quantum computing system to perform any one or more of the methodologies disclosed herein. The term "computer-readable medium" includes, but is not limited to, data repositories in the form of solid-state memories, optical media, and magnetic media.

Figure 9:
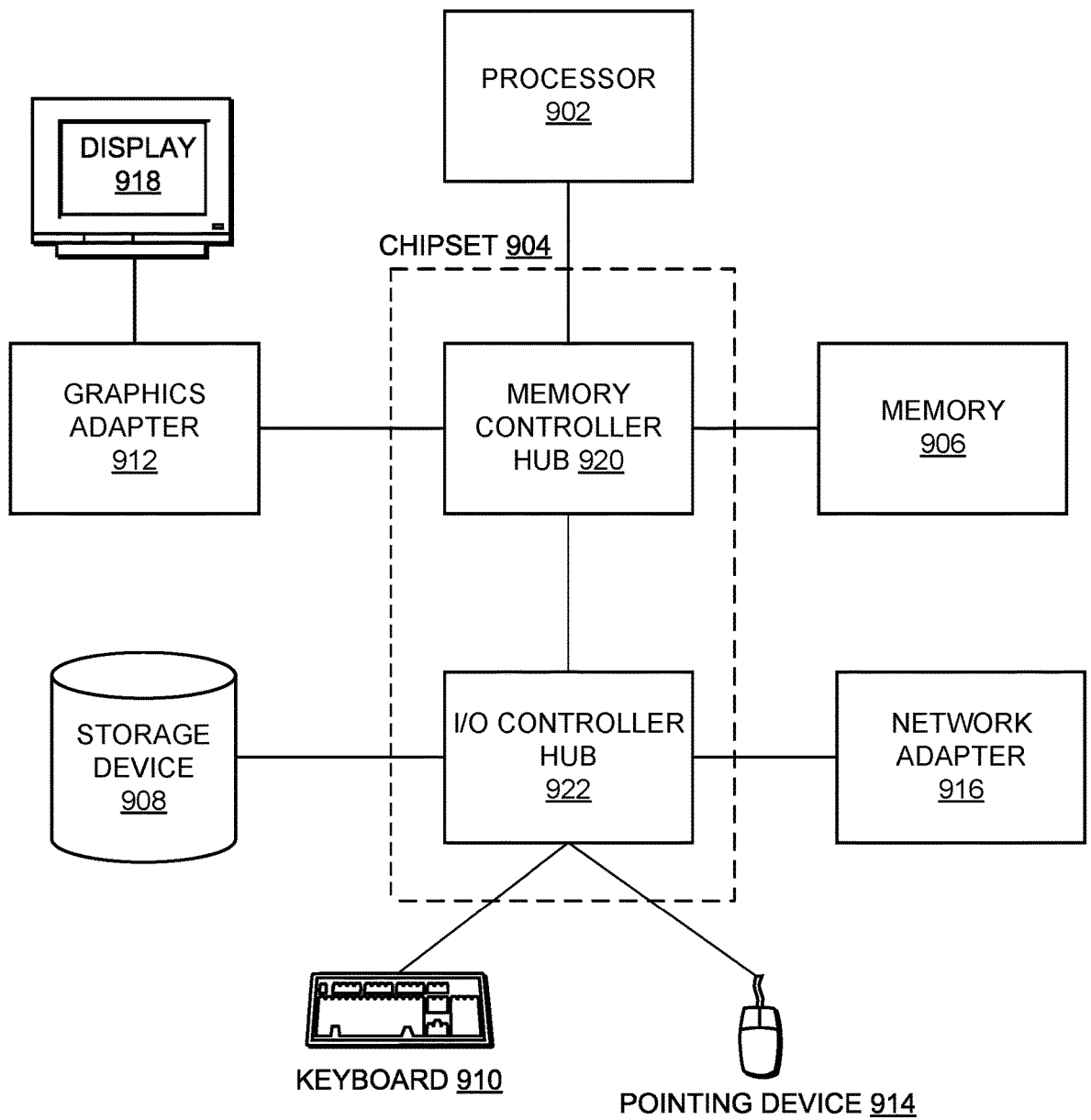
FIG. 9 is an example architecture of a classical computing system.

FIG. 9 is an example architecture of a classical computing system 810, according to an embodiment. The quantum computing system 820 may also have one or more components described with respect to FIG. 9. FIG. 9 depicts a high-level block diagram illustrating physical components of a computer system used as part or all of one or more entities described herein, in accordance with an embodiment. A computer may have additional, less, or variations of the components provided in FIG. 9. Although FIG. 9 depicts a computer 900, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 9 are at least one processor 902 coupled to a chipset 904. Also coupled to the chipset 904 are a memory 906, a storage device 908, a keyboard 910, a graphics adapter 912, a pointing device 914, and a network adapter 916. A display 918 is coupled to the graphics adapter 912. In one embodiment, the functionality of the chipset 904 is provided by a memory controller hub 920 and an I/O hub 922. In another embodiment, the memory 906 is coupled directly to the processor 902 instead of the chipset 904. In some embodiments, the computer 900 includes one or more communication buses for interconnecting these components. The one or more communication buses optionally include circuitry (sometimes called a chipset) that interconnects and controls communications between system components.

The storage device 908 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 908 can also be referred to as persistent memory. The pointing device 914 may be a mouse, track ball, or other type of pointing device, and is used in combination with the keyboard 910 to input data into the computer 900. The graphics adapter 912 displays images and other information on the display 918. The network adapter 916 couples the computer 900 to a local or wide area network.

The memory 906 holds instructions and data used by the processor 902. The memory 906 can be non-persistent memory, examples of which include high-speed random access memory, such as DRAM, SRAM, DDR RAM, ROM, EEPROM, flash memory.

As is known in the art, a computer 900 can have different or other components than those shown in FIG. 9. In addition, the computer 900 can lack certain illustrated components. In one embodiment, a computer 900 acting as a server may lack a keyboard 910, pointing device 914, graphics adapter 912, or display 918. Moreover, the storage device 908 can be local or remote from the computer 900 (such as embodied within a storage area network (SAN)).

As is known in the art, the computer 900 is adapted to execute computer program modules for providing functionality described herein. As used herein, the term "module" refers to computer program logic utilized to provide the specified functionality. Thus, a module can be implemented in hardware, firmware, or software. In one embodiment, program modules are stored on the storage device 908, loaded into the memory 906, and executed by the processor 302.

13. ADDITIONAL CONSIDERATIONS

The disclosure above describes example embodiments for purposes of illustration only. Any features that are described as essential, important, or otherwise implied to be required should be interpreted as only being required for that embodiment and are not necessarily included in other embodiments.

Additionally, the disclosure above uses the phrase "we" (and other similar phases) to reference an entity that is performing an operation (e.g., a step in an algorithm). These phrases are used for convenience. These phrases may refer to a computing system (e.g., computing system 100) that is performing the described operations.

Some portions of above disclosure describe the embodiments in terms of algorithmic processes or operations. These algorithmic descriptions and representations are commonly used by those skilled in the computing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. In some cases, a module can be implemented in hardware, firmware, or software.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Similarly, use of "a" or "an" preceding an element or component is done merely for convenience. This description should be understood to mean that one or more of the elements or components are present unless it is obvious that it is meant otherwise. As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Alternative embodiments are implemented in computer hardware, firmware, software, and/or combinations thereof. Implementations can be implemented in a computer program product tangibly embodied in a machine-readable storage device for execution by a programmable processor; and method steps can be performed by a programmable processor executing a program of instructions to perform functions by operating on input data and generating output. As used herein, 'processor' may refer to one or more processors. Embodiments can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random-access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits) and other forms of hardware.

Although the above description contains many specifics, these should not be construed as limiting the scope of the disclosure but merely as illustrating different examples. It should be appreciated that the scope of the disclosure includes other embodiments not discussed in detail above. Various other modifications, changes, and variations which will be apparent to those skilled in the art may be made in the arrangement, operation, and details of the methods and apparatuses disclosed herein without departing from the spirit and scope of the disclosure.

What is claimed is:

1. A method comprising:
receiving a function $f(x)$ describing a quantity of a resource, x representing a set of k parameters of the quantity;
preparing a quantum circuit configured to implement a quantum gradient algorithm when executed on four qubit registers of a quantum computing system, the quantum gradient algorithm scaling as $\mathcal{O}(\sqrt{k}/\in)$ and including a phase oracle $O_{Sf}^m$ defined by a finite-difference approximation with an order greater than zero, wherein, to implement the phase oracle $O_{Sf}^m$, the quantum circuit includes (1) a first quantum unitary operator to be applied to qubits in the first and second qubit registers and (2) a second quantum unitary operator to be applied to qubits in the third and fourth qubit registers; and
repeatedly executing the quantum circuit on qubits of the quantum computing system to determine a k-dimensional gradient of the function $f(x)$ within an error $\in$ at point $x_0$, wherein executing the quantum circuit comprises:
applying the first quantum unitary operator to qubits in the first qubit register and in the second qubit register, the first quantum unitary operator given by $$\mathcal{A}_+:|\vec{0}\rangle|x\rangle \to (\sqrt{1-f(x)}|\psi_o(x)\rangle|0\rangle + \sqrt{f(x)}|\psi_1(x)\rangle|1\rangle)|x\rangle,$$

where $|\psi_o(x)\rangle$ and $|\psi_1(x)\rangle$ are normalized quantum states; and
applying the second quantum unitary operator to qubits in the third qubit register and in the fourth qubit register, the second quantum unitary operator given by $\mathcal{A}_-:|\vec{0}\rangle|x\rangle \to (\sqrt{1-f(-x)}|\psi_0(-x)\rangle|0\rangle + \sqrt{f(-x)}|\psi_1(-x)\rangle|1\rangle)|x\rangle$, where $|\psi_0(-x)\rangle$ and $|\psi_1(-x)\rangle$ are normalized quantum states.

2. The method of claim 1, wherein executing the quantum circuit further comprises:
   subsequent to applying the first quantum unitary operator, applying a third quantum unitary operator to qubits in the first qubit register and in the second qubit register, the third quantum unitary operator given by $\mathcal{A}_+ = \mathcal{A} + S_0 \mathcal{A}_+^\dagger S_{\psi_0}$, where $S_0 = \Pi - 2|\vec{0}\rangle\langle\vec{0}|$ and $S_{\psi_0} = \Pi - 2|\psi_0(x)\rangle|0\rangle\langle 0|\langle\psi_0(x)|$; and
   subsequent to applying the second quantum unitary operator, applying a fourth quantum unitary operator to qubits in the third qubit register and in the fourth qubit register, the fourth quantum unitary operator given by $\mathcal{A}_- = \mathcal{A}_- S_0 \mathcal{A}_-^\dagger S_{\psi_0}$.

3. The method of claim 2, wherein:
   the third quantum unitary operator is applied multiple times to qubits in the first qubit register and in the second qubit register; and
   the fourth quantum unitary operator is applied multiple times to qubits in the third qubit register and in the fourth qubit register.

4. The method of claim 3, wherein executing the quantum circuit further comprises:
   prior to applying the first quantum unitary operator, applying Hadamard gates to qubits in the first qubit register;
   prior to applying the second quantum unitary operator, applying controlled NOT (CNOT) gates to qubits in the third qubit register, the CNOT gates controlled by qubits in the first qubit register; and
   subsequent to applying the third and fourth quantum unitary operators, applying CNOT gates to qubits in the third qubit register, the CNOT gates controlled by qubits in the first qubit register.

5. The method of claim 4, wherein executing the quantum circuit further comprises applying an inverse quantum Fourier Transform to qubits in the first qubit register.

6. The method of claim 1, wherein the phase oracle $O_{Sf}^m$ is given by:

$$O_{Sf}^m:|x\rangle \to e^{2\pi i S \Sigma_{l=-m}^m a_l^{(2m)}) f(lx)}|x\rangle,$$

where m is the finite-difference approximation order greater than zero, $|x\rangle$ is a k-dimensional vector representing the set of k parameters, S is a scaling factor controlling the accuracy of the finite-difference approximation, and $a_l^{(2m)}$ are coefficients of the finite-difference approximation of order m.

7. The method of claim 6, wherein $m < \log(c\sqrt{k}/\in)$, where c is a smoothness parameter of a Gevrey class $G^{1/2}$ function.

8. The method of claim 6, wherein m=1.

9. The method of claim 1, further comprising repeatedly executing a quantum function algorithm on the quantum computing system to determine the function $f(x)$ within an error $\in_p$.

10. The method of claim 9, wherein the quantum function algorithm is a quantum amplitude estimation algorithm.

11. The method of claim 9, wherein a complexity of the quantum function algorithm scales as $\mathcal{O}(1/\in_p)$.

12. The method of claim 1, wherein $f(x)$ does not have a closed form solution.

13. The method of claim 1, wherein $f(x)$ is not a Gevrey class $G^{1/2}$ function.

14. The method of claim 1, wherein executing the quantum gradient algorithm comprises executing a quantum circuit on qubits of the quantum computing system.

15. The method of claim 1, wherein quantum gradient algorithm scales better than $\mathcal{O}(\sqrt{k}/\in)$.

16. The method of claim 1, wherein determining the k-dimensional gradient of the function $f(x)$ comprises performing a maximum likelihood estimation (MLE).

17. The method of claim 1, wherein determining the k-dimensional gradient of the function $f(x)$ comprises performing automatic differentiation.

18. A method comprising:
   receiving a function $f(x)$ describing a quantity of a resource, wherein x is a k-dimensional vector representing a set of k parameters of the quantity;
   generating a set of instructions to repeatedly execute a quantum gradient algorithm on a quantum computing system, the quantum gradient algorithm including a phase oracle $O_{Sf}^m$ defined by a finite difference approximation with an order greater than zero, wherein a complexity of the quantum gradient algorithm scales as $\mathcal{O}(\sqrt{k}/\in)$, wherein the set of instructions further include instructions to:
      apply a first quantum unitary operator to qubits in a first qubit register and in a second qubit register, the first quantum unitary operator given by $\mathcal{A}_+:|\vec{0}\rangle|x\rangle \to (\sqrt{1-f(x)}|\psi_o(x)\rangle|0\rangle + \sqrt{f(x)}|\psi_1(x)\rangle|1\rangle)|x\rangle$, where $|\psi_0(x)\rangle$ and $|\psi_1(x)\rangle$ are normalized quantum states; and
      apply a second quantum unitary operator to qubits in a third qubit register and in a fourth qubit register, the second quantum unitary operator given by $\mathcal{A}_-:|\vec{0}\rangle|x\rangle \to (\sqrt{1-f(-x)}|\psi_0(-x)\rangle|0\rangle + f(-x)|\psi_1(-x)\rangle|1\rangle)|x\rangle$,
      where $|\psi_0(-x)\rangle$ and $|\psi_1(-x)\rangle$ are normalized quantum states;
   transmitting the set of instructions to the quantum computing system;
   receiving, from the quantum computing system, quantum state data; and
   determining, based on the quantum state data, a k-dimensional gradient of the function $f(x)$ within an error $\in$ at point $x_0$.

19. A non-transitory computer-readable storage medium comprising stored instructions which, when executed by a computing system, cause the computing system to perform operations comprising:
   receiving a function $f(x)$ describing a quantity of a resource, wherein x represents a set of k parameters of the quantity; and
   repeatedly executing a quantum gradient algorithm on a quantum computing system to determine a k-dimensional gradient of the function $f(x)$ within an error $\in$ at point $x_0$, the quantum gradient algorithm including a phase oracle $O_{Sf}^m$ defined by a finite difference approximation with an order greater than zero, wherein a complexity of the quantum gradient algorithm scales as $\mathcal{O}(\sqrt{k}/\in)$, wherein executing the quantum gradient algorithm comprises:
      applying a first quantum unitary operator to qubits in a first qubit register and in a second qubit register, the first quantum unitary operator given by $\mathcal{A}_+ : |\vec{0}\rangle|x\rangle \to (\sqrt{1-f(x)}|\psi_o(x)\rangle|0\rangle + \sqrt{f(x)}|\psi_1(x)\rangle|1\rangle)|x\rangle$, where $|\psi_0(x)\rangle$ and $|\psi_1(x)\rangle$ are normalized quantum states; and applying a second quantum unitary operator to qubits in a third qubit register and in a fourth qubit register, the second quantum unitary operator given by $\mathcal{A}_- : |\vec{0}\rangle|x\rangle \to (\sqrt{1-f(-x)}|\psi_0(-x)\rangle|0\rangle + \sqrt{f(-x)}|\psi_1(-x)\rangle|1\rangle)|x\rangle$, where $|\psi_0(-x)\rangle$ and $|\psi_1(-x)\rangle$ are normalized quantum states.

* * * * *